US011732774B2

(12) United States Patent
Kieran et al.

(10) Patent No.: US 11,732,774 B2
(45) Date of Patent: Aug. 22, 2023

(54) COMBINED ISOLATION AND TORSIONAL VIBRATION DAMPING DEVICE

(71) Applicant: Litens Automotive Partnership, Woodbridge (CA)

(72) Inventors: Sean Kieran, Woodbridge (CA); Ahmed Abdul Wadood Anwer, Toronto (CA); Geoffrey William Ryeland, North York (CA); Ron Farewell, Mississauga (CA); Kyle Pugsley, Woodbridge (CA); Frank Verriet, Woodbridge (CA); Andrew Malcolm Boyes, Aurora (CA)

(73) Assignee: LITENS AUTOMOTIVE PARTNERSHIP, Woodbridge (CA)

( * ) Notice: Subject to any disclaimer, the term of this patent is extended or adjusted under 35 U.S.C. 154(b) by 366 days.

(21) Appl. No.: 17/273,206

(22) PCT Filed: Sep. 10, 2019

(86) PCT No.: PCT/CA2019/051277
§ 371 (c)(1),
(2) Date: Mar. 3, 2021

(87) PCT Pub. No.: WO2020/051694
PCT Pub. Date: Mar. 19, 2020

(65) Prior Publication Data
US 2021/0324937 A1    Oct. 21, 2021

Related U.S. Application Data

(60) Provisional application No. 62/889,558, filed on Aug. 20, 2019, provisional application No. 62/729,224, filed on Sep. 10, 2018.

(51) Int. Cl.
*F16F 15/126*    (2006.01)
*F16D 3/12*    (2006.01)
(Continued)

(52) U.S. Cl.
CPC .............. *F16F 15/126* (2013.01); *F16D 3/12* (2013.01); *F16D 3/80* (2013.01); *F16D 13/76* (2013.01);
(Continued)

(58) Field of Classification Search
CPC ...... F16H 2055/366; F16H 55/36; F16H 7/20; F16F 15/1442; F16F 15/123; F16F 15/12;
(Continued)

(56) References Cited

U.S. PATENT DOCUMENTS 2,672,907 A * 3/1954 MacLean .................. B60B 9/10
152/41
5,168,774 A * 12/1992 Andra ..................... F16D 1/064
464/89
(Continued)

FOREIGN PATENT DOCUMENTS

CN    204677683 U    9/2015
DE    102015205247 A1    10/2015
(Continued)

OTHER PUBLICATIONS

International Search Report and Written Opinion for PCT/CA2019/051277 dated Nov. 12, 2019.

*Primary Examiner* — Henry Y Liu
(74) *Attorney, Agent, or Firm* — Aird & McBurney LP

(57) ABSTRACT

In an aspect a device for a driven shaft is provided that receives an input torque that varies cyclically between a peak input torque and a low input torque at a peak input torque frequency, which includes a shaft adapter, a rotary drive member, at least one isolation member, a torsional vibration damping structure including an inertia member and a elastomeric damping member, and a supplemental damping structure. The supplemental damping structure applies a supplemental damping torque to resist relative movement
(Continued)

between the rotary drive member and the inertia member in addition to damping provided by the elastomeric damping member. A sum of torques including the supplemental damping torque limits a maximum twist between a first end of the driven shaft and a second end of the driven shaft, to below a yield point of the driven shaft.

20 Claims, 12 Drawing Sheets

(51) Int. Cl.
*F16D 3/80* (2006.01)
*F16D 13/76* (2006.01)
*F16D 37/00* (2006.01)
*F16D 37/02* (2006.01)
*F16H 7/20* (2006.01)
*F16H 55/36* (2006.01)

(52) U.S. Cl.
CPC ........... *F16D 37/008* (2013.01); *F16D 37/02* (2013.01); *F16H 7/20* (2013.01); *F16H 55/36* (2013.01); *F16D 2300/22* (2013.01); *F16F 2224/045* (2013.01); *F16F 2238/04* (2013.01); *F16H 2055/366* (2013.01)

(58) Field of Classification Search
CPC ............... F16F 12/126; F16F 2224/045; F16F 2238/04; F16D 41/206; F16D 3/12; F16D 7/022; F16D 3/80; F16D 13/76; F16D 37/008; F16D 37/02; F16D 2300/22
USPC .......................................................... 474/94
See application file for complete search history.

(56) References Cited

U.S. PATENT DOCUMENTS

| | | | | |
|---|---|---|---|---|
| 5,308,289 A * | 5/1994 | Funahashi | ............... | F16F 15/10 474/903 |
| 5,377,962 A * | 1/1995 | Ochs | .......... | F16D 3/50 267/281 |
| 5,405,296 A * | 4/1995 | Cerny | ................. | F16F 15/1442 474/135 |
| 5,988,015 A * | 11/1999 | Riu | .......... | F16H 55/36 74/574.2 |
| 6,026,709 A * | 2/2000 | Depp | ....... | F16H 55/36 474/166 |
| 6,048,284 A * | 4/2000 | Gerhardt | ............... | F16F 15/315 474/902 |
| 6,062,104 A * | 5/2000 | Allport | ............... | F16F 15/1442 192/66.1 |
| 6,106,421 A * | 8/2000 | Graber | .................... | F16H 55/36 474/94 |
| 6,702,681 B1* | 3/2004 | Ochs | .......... | F16H 55/36 464/7 |
| 6,955,252 B2* | 10/2005 | Allport | ............... | F16F 15/12 192/41 R |
| 7,055,243 B2* | 6/2006 | Hodjat | ................. | F16F 15/126 72/82 |
| 7,591,357 B2* | 9/2009 | Antchak | ................. | F16F 15/12 192/81 C |
| 7,658,127 B2* | 2/2010 | Crist | .......... | F16H 7/18 74/572.2 |
| 8,302,753 B2* | 11/2012 | Antchak | ............. | F16F 15/1442 192/113.32 |
| 8,313,400 B2* | 11/2012 | Serkh | ....... | F16H 55/36 474/69 |
| 8,506,434 B2* | 8/2013 | Harvey | .................... | F16D 3/72 464/57 |
| 8,789,670 B2* | 7/2014 | Antchak | ............... | F16D 41/206 192/55.61 |
| 9,581,233 B2* | 2/2017 | Manzoor | ............ | F16F 15/1442 |
| 9,989,103 B2* | 6/2018 | Antchak | ................. | F16H 55/36 |
| 2004/0159507 A1* | 8/2004 | Allport | ................... | F16H 55/36 188/130 |
| 2004/0166974 A1* | 8/2004 | Hodjat | ................. | F16F 15/126 474/170 |
| 2006/0094547 A1* | 5/2006 | Xu | ......... | F16F 15/126 474/94 |
| 2006/0172832 A1* | 8/2006 | Watanabe | ............. | F16F 15/126 474/94 |
| 2006/0264282 A1* | 11/2006 | Moriya | .................... | F16H 55/36 474/94 |
| 2007/0037644 A1* | 2/2007 | Mevissen | ............... | F16F 15/123 474/70 |
| 2007/0209899 A1* | 9/2007 | Liu | ........... | F16D 3/66 192/55.2 |
| 2007/0249442 A1* | 10/2007 | Grunau | ................... | F16H 55/36 474/94 |
| 2009/0000422 A1* | 1/2009 | Christenson | .......... | F16F 15/126 188/379 |
| 2009/0105021 A1* | 4/2009 | Amati | .................. | H02K 49/046 474/94 |
| 2009/0223775 A1* | 9/2009 | Hodjat | ...................... | F16D 3/12 192/41 S |
| 2009/0318252 A1* | 12/2009 | Riu | ........... | F16H 55/36 474/94 |
| 2010/0099527 A1* | 4/2010 | Rolando | ............. | F16F 15/1442 474/94 |
| 2011/0263365 A1* | 10/2011 | Mende | ................ | F16F 15/1297 474/94 |
| 2012/0015768 A1* | 1/2012 | Serkh | ....................... | F16H 55/36 474/94 |
| 2012/0094791 A1* | 4/2012 | Lee | .......... | F16H 55/36 474/94 |
| 2012/0172163 A1* | 7/2012 | Fitz | .......... | F16H 55/36 474/94 |
| 2012/0231909 A1* | 9/2012 | Shin | ....... | F16F 15/126 474/94 |
| 2013/0284139 A1* | 10/2013 | Staley | ................ | F16F 15/1442 474/94 |
| 2015/0105196 A1* | 4/2015 | Lee | .......... | F16H 55/36 474/94 |
| 2015/0316138 A1* | 11/2015 | Dell | ........ | F16H 55/36 474/94 |
| 2015/0354689 A1* | 12/2015 | Manzoor | ............. | F16F 15/1209 474/94 |
| 2016/0003342 A1* | 1/2016 | Manzoor | ................. | F16H 55/36 474/94 |
| 2016/0146328 A1* | 5/2016 | Dell | ........ | B60K 25/02 474/94 |
| 2016/0153542 A1* | 6/2016 | Wick | ....... | F16H 55/36 474/94 |
| 2016/0195162 A1* | 7/2016 | Manzoor | ............. | F16F 15/1442 474/166 |
| 2017/0234419 A1* | 8/2017 | Manzoor | ................ | F16F 15/126 474/94 |
| 2018/0045288 A1* | 2/2018 | Cariccia | ............ | F16H 55/36 |
| 2018/0051792 A1* | 2/2018 | Cariccia | ............ | F16F 15/123 |
| 2018/0087584 A1* | 3/2018 | Al-Kattan | ............... | F16D 41/07 |
| 2018/0163788 A1* | 6/2018 | Dell | ........ | F16H 55/36 |
| 2023/0092982 A1* | 3/2023 | Manzoor | ................ | F16H 55/36 474/94 |

FOREIGN PATENT DOCUMENTS

| | | |
|---|---|---|
| JP | 2001159448 A | 6/2001 |
| JP | 2018105497 A | 7/2018 |
| WO | 2018154509 A1 | 8/2018 |
| WO | 2020051694 A1 | 3/2020 |
| WO | 2020051694 A9 | 3/2020 |

* cited by examiner

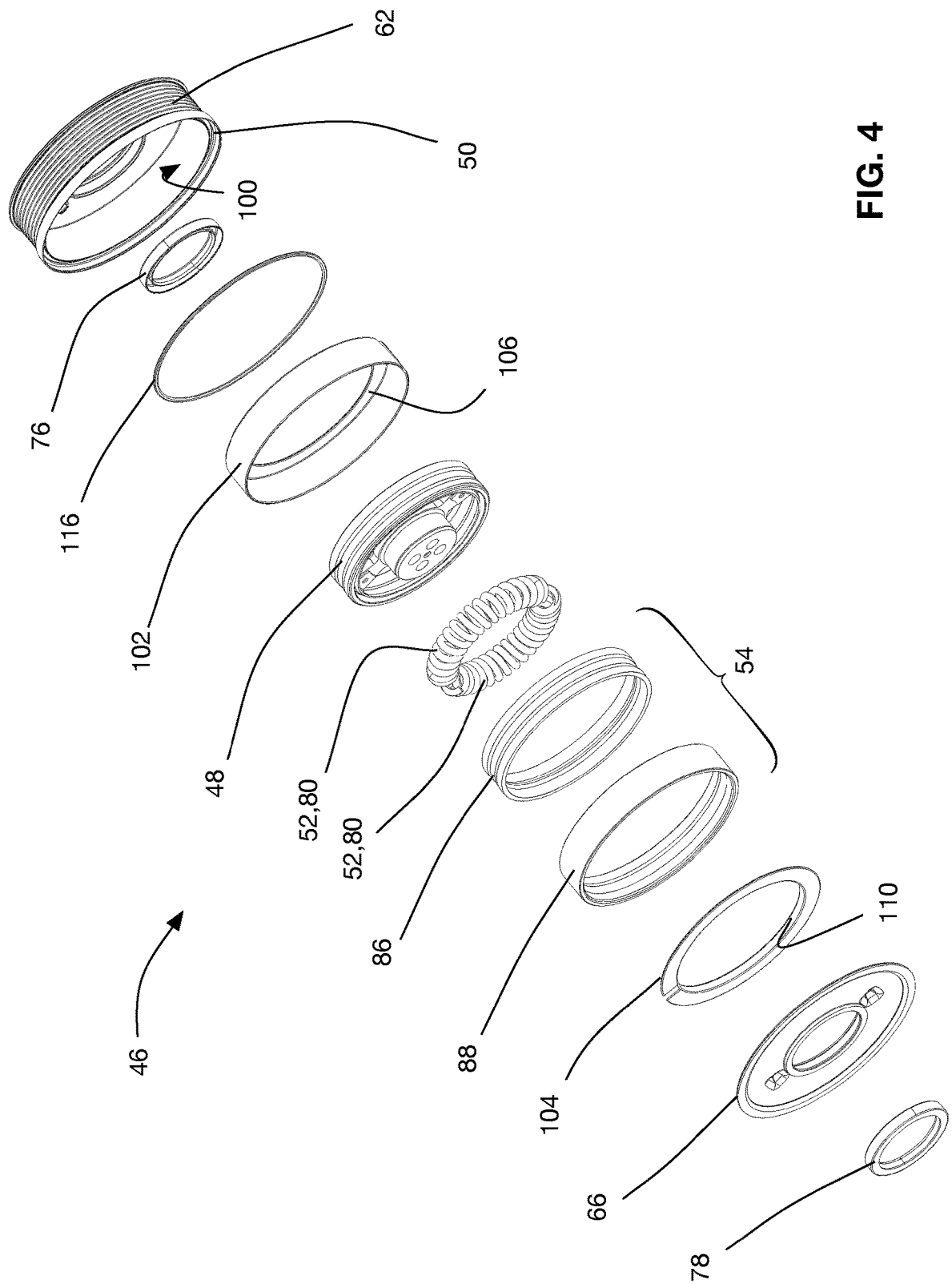

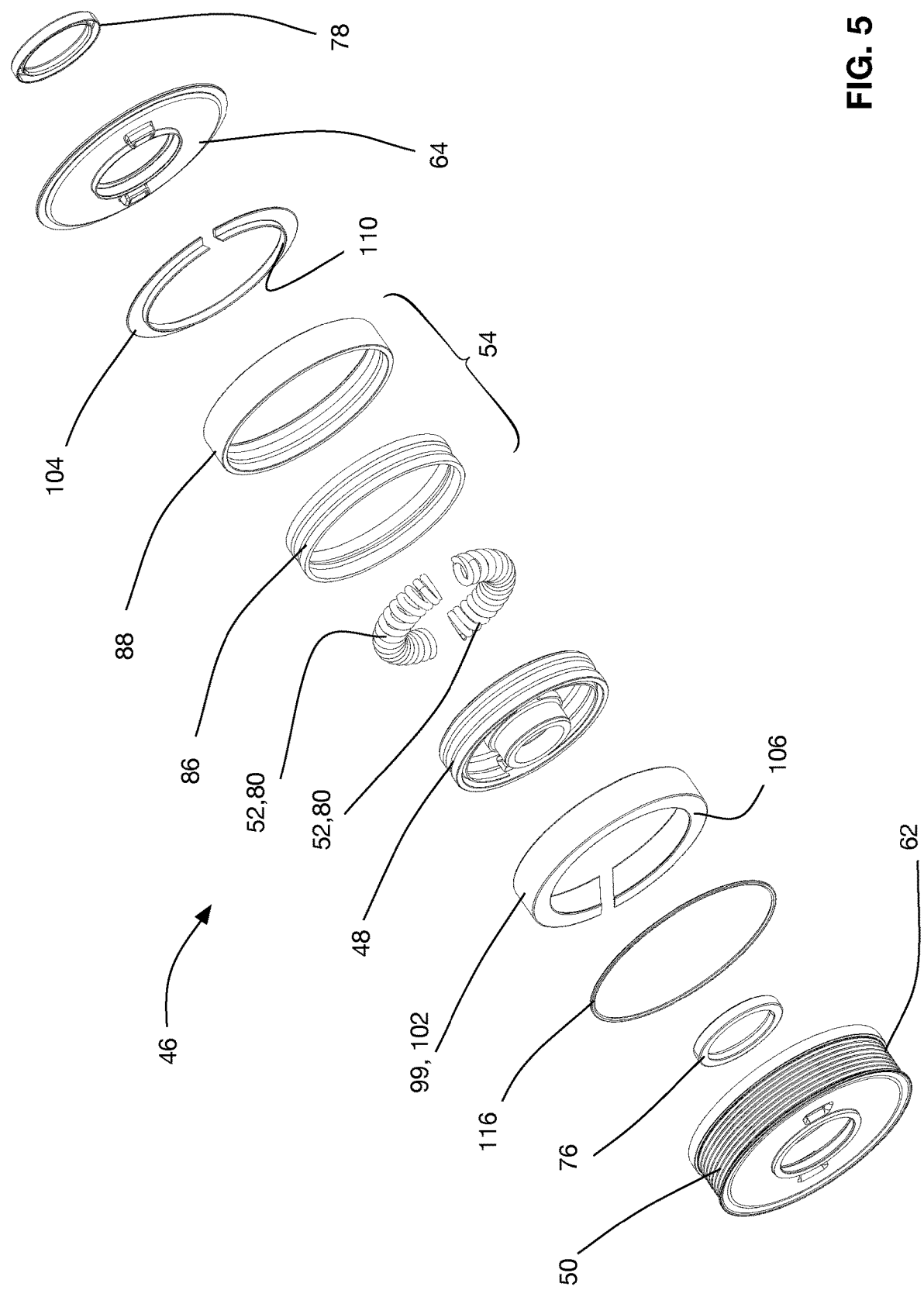

COMBINED ISOLATION AND TORSIONAL VIBRATION DAMPING DEVICE

CROSS-REFERENCE TO RELATED APPLICATIONS

This application claims the benefit of United States Provisional Application No. 62/729,224, filed Sep. 10, 2018, and of U.S. Provisional Application No. 62/889,558, filed Aug. 20, 2019, the contents of both of which are incorporated herein by reference in their entirety.

FIELD

The specification relates generally to isolators and torsional vibration dampers. In particular, the following relates to a device that combines an isolator and a torsional vibration damper.

BACKGROUND OF THE DISCLOSURE

It is known that the crankshaft in a vehicular engine receives uneven torque that is the result of periodic combustion of fuel in the cylinders. The combustion in each cylinder, in turn, provides a brief moment of high torque, which drives the associated piston downwards, thereby applying a torque to the crankshaft via the associated connecting rod, followed some time later by another brief moment of high torque as combustion occurs in another cylinder. As a result, the crankshaft is subject to torsional vibrations, which are fluctuations in its rotational speed during operation of the engine. An isolator is a device that is mounted to the end of the crankshaft and engages a FEAD (front-engine accessory drive) belt to various accessories during operation of the engine. The isolator reduces the tendency for torsional vibrations in the crankshaft, to be transmitted through the FEAD belt to the various accessories. A TVD (torsional vibration damper) is a device that reduces the amount of twist that occurs in the crankshaft itself during these torque fluctuations.

While both the isolator and the TVD are beneficial to the engine, they occupy a significant amount of room and can be relatively heavy. In modern vehicles, there is a continued desire to reduce the weight of the systems in a vehicle, and to make such systems more compact.

SUMMARY OF THE DISCLOSURE

In one aspect, there is provided a combined isolation and torsional vibration damping device for a driven shaft that receives an input torque that varies cyclically between a peak input torque and a low input torque at a peak input torque frequency, comprising: a shaft adapter that is connectible to the driven shaft, wherein the shaft adapter defines an axis; a rotary drive member that is rotatably connected to the shaft adapter, wherein the rotary drive member has an exterior drive surface that is engageable with an external torque load so as to transmit torque to the external torque load, and wherein the rotary drive member at least partially encloses a chamber; at least one isolation member positioned to transfer torque between the shaft adapter and the rotary drive member, wherein the at least one isolation member has an isolation member stiffness that is selected such that a natural frequency of a system made up of the external torque load and all portions of the combined isolation and torsional vibration damping device which transmit torque from the shaft adapter to the external torque load, is lower than the peak input torque frequency; and a torsional vibration damping structure that includes an inertia member that is entirely contained in the chamber and an elastomeric damping member positioned to elastically connect the shaft adapter and the inertia member; wherein a stiffness of the elastomeric damping member and an inertia of the inertia member provide the torsional vibration damping structure with a natural frequency that is at least 50% of the natural frequency of the driven shaft; wherein the chamber contains a damping fluid, and wherein the inertia member has a damping fluid engagement surface that travels through the damping fluid during relative movement between the rotary drive member and the shaft adapter so as to cause viscous damping between the inertia member and the rotary drive member; and wherein a viscosity of the damping fluid, an inertia of the inertia member, and a stiffness of the elastomeric damping member are selected such that, during use of the driven shaft, a sum of torques applied to the shaft adapter from a plurality of torque sources including a torque from viscous damping from movement of the inertia member through the damping fluid, a torque from viscous damping within the elastomeric damping member, a torque from elastic deformation of the elastomeric damping member, and a torque from inertia in the inertia member, opposes a torque applied to the shaft adapter from the driven shaft at a natural frequency of the driven shaft with the combined isolation and torsional vibration damping device thereon and limits a maximum twist between a first end of the driven shaft and a second end of the driven shaft, to below a yield point of the driven shaft.

The combined isolation and torsional vibration damping device can further include a radially outer support layer positioned radially between the inertia member and a radially inner surface of the rotary drive member in the chamber, which supports the rotary drive member on the shaft adapter.

The radially outer support layer can be fixedly connected to the rotary drive member and can be slidably engaged with the inertia member.

The combined isolation and torsional vibration damping device can further include a first side support layer positioned axially between the inertia member and a first side wall of the rotary drive member and a second side support layer positioned axially between the inertia member and a second side wall of the rotary drive member.

The inertia member can have a radially outer surface that radially supports the radially inner surface of the rotary drive member via the radially outer support layer and can be a contiguous cylindrical surface.

The elastomeric damping layer can be recessed axially from the inertia member so as to prevent contact between the elastomeric damping layer and the first and second side support layers.

The damping fluid can be a lubricant and the at least one isolation member can be a plurality of arcuate helical compression springs which are immersed in the lubricant.

The elastomeric damping member can be positioned in the chamber for exposure to the damping fluid so as to cause transfer of heat from the elastomeric damping member to the damping fluid.

The damping fluid can have a heat transfer coefficient that is selected to keep a temperature of the elastomeric damping member below a selected maximum permitted temperature.

The rotary drive member can include an exterior surface finish that is selected from a group of surface finishes consisting of: dimpled, knurled and coated, so as to increase heat transfer from the damping fluid out of the rotary drive member, so as to maintain a temperature of the elastomeric damping member to be below a selected threshold temperature.

The rotary drive member can be a pulley that includes a circumferential portion on which the exterior drive surface is positioned, wherein the circumferential portion is supported by a first side wall and a second side wall that extend between the circumferential portion and the shaft adapter, wherein the first side wall is a separate member from a remainder of the pulley and has an inner side wall face, an outer side wall face and an edge face between the inner and outer side wall faces, wherein the inner side wall face is engaged with a mounting face of the circumferential portion, wherein the circumferential portion includes a surrounding wall that surrounds and engages the edge face, wherein a first one of the surrounding wall and the edge face has a plurality of projections that engage a plurality of valleys in a second one of the surrounding wall and the edge face to rotationally lock the first side wall to the circumferential portion, wherein the surrounding wall is bent over to engage the outer side wall face so as to axially lock the first side wall to the circumferential portion.

The combined isolation and torsional vibration damping device can further include a seal member positioned in a channel in at least one of the mounting face and the inner side wall face and is compressed so as to seal against leakage from the chamber between the first side wall and the circumferential portion.

The second side wall and the circumferential portion can be formed from a single piece of material.

The rotary drive member can be a pulley and the exterior drive surface can be bound by a first flange having a first flange axially exterior wall surface and a second flange having a second flange axially exterior wall surface, and the inertia member can extend axially within the first flange exterior wall surface and the second flange axially exterior wall surface.

The rotary drive member can be a pulley and the external torque transfer member can be an accessory drive belt.

The driven shaft can be a crankshaft of an internal combustion engine and the sum of torques can limit the maximum twist from the first end of the driven shaft to the second end of the driven shaft to less than 0.35 degrees.

The elastomeric damping member can have a center of mass that has a center of mass axial position, and wherein the inertia member can have a center of mass that has a center of mass axial position, the center of mass axial position for the elastomeric damping member can be approximately the same as the center of mass axial position for the inertia member.

The inertial member can include a plurality of fluid flow channels that are sized to provide a selected amount of damping in relation to a relative speed between the inertia member and the rotary drive member.

The damping fluid can be a traction fluid.

The damping fluid can be a rheopectic fluid.

The damping fluid can have a viscosity that is adjustable via an electric current.

The damping fluid engagement surface can be directional so as to provide a greater amount of viscous damping movement of the inertia member relative to the rotary drive member in a first rotational direction than during movement of the inertia member relative to the rotary drive member in a second rotational direction.

The inertia member can have a damping fluid engagement surface that is coated in an oleophilic coating.

The damping fluid engagement surface can have a selected drag coefficient that is selected in addition to selecting the viscosity of the damping fluid, so as to provide a selected amount of the torque from viscous damping from movement of the inertia member through the damping fluid.

In another aspect, there is provided a combined isolation and torsional vibration damping device for a driven shaft that receives an input torque that varies cyclically between a peak input torque and a low input torque at a peak input torque frequency, comprising: a shaft adapter that is connectible to the driven shaft, wherein the shaft adapter defines an axis; a rotary drive member that is rotatably connected to the shaft adapter, wherein the rotary drive member has an exterior drive surface that is engageable with an external torque load so as to transmit torque to the external torque load, and wherein the rotary drive member at least partially encloses a chamber; at least one isolation member positioned to transfer torque between the shaft adapter and the rotary drive member, wherein the at least one isolation member has an isolation member stiffness that is selected such that a natural frequency of a system made up of the external torque load and all portions of the combined isolation and torsional vibration damping device which transmit torque from the shaft adapter to the external torque load, is lower than the peak input torque frequency; a torsional vibration damping structure that includes an inertia member that is entirely contained in the chamber and an elastomeric damping member positioned to elastically connect the shaft adapter and the inertia member, wherein the inertia member has an inertia, and the elastomeric damping member has a stiffness, wherein a stiffness of the elastomeric damping member and the inertia of the inertia member provide the torsional vibration damping structure with a natural frequency that is at least 50% of the natural frequency of the driven shaft; and a supplemental damping structure that is contained in the chamber, wherein the supplemental damping structure applies a supplemental damping torque to resist relative movement between the rotary drive member and the inertia member in addition to damping provided by the elastomeric damping member; wherein the supplemental damping torque, the inertia of the inertia member, and the stiffness of the elastomeric damping member are selected such that, during use of the driven shaft, a sum of torques applied to the shaft adapter from a plurality of torque sources including the supplemental damping torque, a torque from viscous damping within the elastomeric damping member, a torque from elastic deformation of the elastomeric damping member, and a torque from the inertia in the inertia member, opposes a torque applied to the shaft adapter from the driven shaft at a natural frequency of the driven shaft with the combined isolation and torsional vibration damping device thereon, and limits a maximum twist between a first end of the driven shaft and a second end of the driven shaft, to below a yield point of the driven shaft.

The supplemental damping structure can be a frictional damping structure including a first friction surface arrangement and a second friction surface arrangement that is slidingly engageable with the first friction surface arrangement during relative movement between the inertia member and the rotary drive member generating frictional damping based on an overall coefficient of friction between the first friction surface arrangement and the second friction surface arrangement, wherein the overall coefficient of friction is selected so as to provide the selected supplemental damping torque.

The frictional damping structure can include a radially outer frictional engagement layer positioned radially between the inertia member and a radially inner surface of the rotary drive member in the chamber, and the radially outer frictional engagement layer can be slidingly engageable with at least one of the rotary drive member and the inertia member so as to generate friction.

The radially outer frictional engagement layer can be a bushing that is slidable relative to both the rotary drive member and to the inertia member.

The frictional damping structure can further include a first side frictional engagement layer positioned axially between the inertia member and a first side wall of the rotary drive member and a second side frictional engagement layer positioned axially between the inertia member and a second side wall of the rotary drive member, wherein each of the first and second side frictional engagement layers is slidingly engageable with at least one of the rotary drive member and the inertia member so as to generate friction.

The elastomeric damping layer can be recessed axially from the inertia member so as to prevent contact between the elastomeric damping layer and the first and second side support layers.

The exterior drive surface can have an axial length and has a geometric center that has a geometric center axial position, and the inertia member can have a center of mass that has a center of mass axial position that is approximately the same as the geometric center axial position.

The rotary drive member can be a pulley, the exterior drive surface can be bound by a first flange having a first flange axially exterior face and a second flange having a second flange axially exterior face, and the inertia member can extend axially, fitting between the first flange axially exterior face and the second flange axially exterior face.

The frictional damping structure can include a first friction plate and a second friction plate that moves rotationally relative to the first friction plate during movement of the inertia member relative to the rotary drive member and wherein a frictional force acting between the first plate and the second plate is adjustable via an electric current, and generate a torque that is included in the torque from frictional damping.

The supplemental damping structure can include a particle clutch that is adjustable via an electric current.

The supplemental damping torque can be adjustable via an electric current.

In a further aspect, there is provided a combined isolation and torsional vibration damping device for a driven shaft that receives an input torque that varies cyclically between a peak input torque and a low input torque at a peak input torque frequency, comprising: a shaft adapter that is connectible to the driven shaft, wherein the shaft adapter defines an axis; a rotary drive member that is rotatably connected to the shaft adapter, wherein the rotary drive member has an exterior drive surface that is engageable with an external torque load so as to transmit torque to the external torque load, and wherein the rotary drive member at least partially encloses a chamber; at least one isolation member positioned to transfer torque between the shaft adapter and the rotary drive member, wherein the at least one isolation member has an isolation member stiffness that is selected such that a natural frequency of a system made up of the external torque load and all portions of the combined isolation and torsional vibration damping device which transmit torque from the shaft adapter to the external torque load, is lower than the peak input torque frequency; a torsional vibration damping structure that includes an inertia member that is entirely contained in the chamber and an elastomeric damping member positioned to elastically connect the shaft adapter and the inertia member, wherein a stiffness of the elastomeric damping member and an inertia of the inertia member provide the torsional vibration damping structure with a natural frequency that is at least 50% of the natural frequency of the driven shaft; and a frictional damping structure including a radially outer frictional engagement layer positioned radially between the inertia member and a radially inner surface of the rotary drive member in the chamber, and which is slidably engaged with at least one of the rotary drive member and the inertia member; wherein the rotary drive member is a pulley and wherein the exterior drive surface is bound by a first flange having a first flange axially exterior wall surface and a second flange having a second flange axially exterior wall surface, and wherein the inertia member extends axially within the first flange exterior wall and the second flange axially exterior wall surfaces.

The frictional damping structure can further include a first side bushing layer positioned axially between the inertia member and a first side wall of the rotary drive member and a second side bushing layer positioned axially between the inertia member and a second side wall of the rotary drive member.

The exterior drive surface can have an axial length and has a geometric center that has a geometric center axial position, and the inertia member can have a center of mass that has a center of mass axial position that is approximately the same as the geometric center axial position.

The rotary drive member can be a pulley and wherein the exterior drive surface is bound by a first flange having a first flange axially exterior wall surface and a second flange having a second flange axially exterior wall surface, and the inertia member can extend axially within the first flange exterior wall and the second flange axially exterior wall surfaces.

The frictional damping structure can be fixedly connected to the rotary drive member and is slidably engaged with the inertia member.

In yet another aspect, there is provided a combined isolation and torsional vibration damping device for a driven shaft that receives an input torque that varies cyclically between a peak input torque and a low input torque at a peak input torque frequency, comprising: a shaft adapter that is connectible to the driven shaft, wherein the shaft adapter defines an axis; a rotary drive member that is rotatably connected to the shaft adapter, wherein the rotary drive member has an exterior drive surface that is engageable with an external torque load so as to transmit torque to the external torque load, and wherein the rotary drive member at least partially encloses a chamber; at least one isolation member positioned to transfer torque between the shaft adapter and the rotary drive member, wherein the at least one isolation member has an isolation member stiffness that is selected such that a natural frequency of a system made up of the external torque load and all portions of the combined isolation and torsional vibration damping device which transmit torque from the shaft adapter to the external torque load, is lower than the peak input torque frequency; a torsional vibration damping structure that includes an inertia member that is entirely contained in the chamber and an elastomeric damping member positioned to elastically connect the shaft adapter and the inertia member, wherein a stiffness of the elastomeric damping member and an inertia of the inertia member provide the torsional vibration damping structure with a natural frequency that is at least 50% of the natural frequency of the driven shaft; a frictional damping structure including a radially outer frictional engagement layer positioned radially between the inertia member and a radially inner surface of the rotary drive member in the chamber, and which is slidably engaged with at least one of the rotary drive member and the inertia member; wherein the exterior drive surface has an axial length and has a geometric center that has a geometric center axial position, and wherein the inertia member has a center of mass that has a center of mass axial position that is approximately the same as the geometric center axial position.

The frictional damping structure can further include a first side bushing layer positioned axially between the inertia member and a first side wall of the rotary drive member and a second side bushing layer positioned axially between the inertia member and a second side wall of the rotary drive member.

In still yet another aspect, there is provided a method of making a combined isolation and torsional vibration damping device for a driven shaft that receives an input torque that varies cyclically between a peak input torque and a low input torque at a peak input torque frequency, comprising: a) obtaining a set of data relating to the driven shaft, a set of TVD performance requirements, a set of isolator performance requirements, a diameter of a rotary drive member that has an exterior drive surface that is engageable with an external torque load, and a set of dimensional restrictions; b) selecting an inertia for an inertia member so as to provide a natural frequency for a torsional vibration damping structure that is based on a natural frequency for the driven shaft; c) selecting dimensional data for the inertia member to have the inertia based on the set of dimensional restrictions, and based on the diameter of the rotary drive member; d) selecting dimensional data for an elastomeric damping member to be positioned radially inside the inertia member, wherein the inertia and the dimensional data for the elastomeric damping member are selected so as to provide a natural frequency for a torsional vibration damping structure that is based on a natural frequency for the driven shaft; e) selecting dimensional data for a shaft adapter that is connectible to the driven shaft, wherein the shaft adapter defines an axis; f) selecting data relating to at least one isolation member that is to be positioned to transfer torque between the shaft adapter and the rotary drive member, wherein the at least one isolation member has an isolation member stiffness that is selected such that a natural frequency of a system made up of the external torque load and all portions of the combined isolation and torsional vibration damping device which transmit torque from the shaft adapter to the external torque load, is lower than the peak input torque frequency; g) selecting a supplementary damping torque to be applied by at least one of friction damping during relative movement between the inertia member and the rotary drive member, viscous damping during relative movement between the inertia member and the rotary drive member and magnetic damping during relative movement between the inertia member and the rotary drive member, wherein the supplementary damping torque is selected such that, during use of the driven shaft, a sum of torques applied to the shaft adapter from a plurality of torque sources including the supplementary damping torque, a torque from viscous damping within the elastomeric damping member, a torque from elastic deformation of the elastomeric damping member, and a torque from inertia in the inertia member, opposes a torque applied to the shaft adapter from the driven shaft at a natural frequency of the driven shaft with the combined isolation and torsional vibration damping device thereon and limits a maximum twist between a first end of the driven shaft and a second end of the driven shaft, to meet at least some of the TVD performance requirements; h) determining whether the isolator performance requirements are met based on the at least one isolation member and the supplementary damping torque; and i) if the set of TVD performance requirements and isolator performance requirements are met, fabricating a combined isolation and torsional vibration damping device based on the selections made in steps b)-h).

The set of TVD performance requirements can include at least one of: a maximum permitted strain in the elastomeric damping member, a maximum permitted torque in the elastomeric damping member, a maximum permitted power dissipation per unit volume in the elastomeric damping member, and a maximum permitted temperature of the elastomeric damping member.

The set of TVD performance requirements can include a maximum permitted amount of twist between a first end of the driven shaft and a second end of the driven shaft.

The driven shaft can be a crankshaft of an internal combustion engine and the supplementary damping torque can be selected such that, during use of the driven shaft, the sum of torques limits the maximum twist from the first end of the driven shaft to the second end of the driven shaft to less than 0.35 degrees.

In another aspect, there is provided a combined isolation and torsional vibration damping device for a driven shaft that receives an input torque that varies cyclically between a peak input torque and a low input torque at a peak input torque frequency, comprising: a shaft adapter that is connectible to the driven shaft, wherein the shaft adapter defines an axis; a rotary drive member that is rotatably connected to the shaft adapter, wherein the rotary drive member has an exterior drive surface that is engageable with an external torque load so as to transmit torque to the external torque load, and wherein the rotary drive member at least partially encloses a chamber; at least one isolation member positioned to transfer torque between the shaft adapter and the rotary drive member, wherein the at least one isolation member has an isolation member stiffness that is selected such that a natural frequency of a system made up of the external torque load and all portions of the combined isolation and torsional vibration damping device which transmit torque from the shaft adapter to the external torque load, is lower than the peak input torque frequency; a torsional vibration damping structure that includes an inertia member that is entirely contained in the chamber and an elastomeric damping member positioned to elastically connect the shaft adapter and the inertia member; wherein a stiffness of the elastomeric damping member and an inertia of the inertia member provide the torsional vibration damping structure with a natural frequency that is at least 50% of the natural frequency of the driven shaft; a radially outer support layer positioned radially between the inertia member and a radially inner surface of the rotary drive member in the chamber, which supports the rotary drive member on the shaft adapter, wherein the inertia member has a radially outer surface that radially supports the radially inner surface of the rotary drive member via the radially outer support layer and is a contiguous cylindrical surface.

The combined isolation and torsional vibration damping device can further include a first side support layer positioned axially between the inertia member and a first side wall of the rotary drive member and a second side support layer positioned axially between the inertia member and a second side wall of the rotary drive member.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which:

FIGS. 4 and 5 are exploded views of the torsional vibration damping device of FIG. 3;

Figure 1:
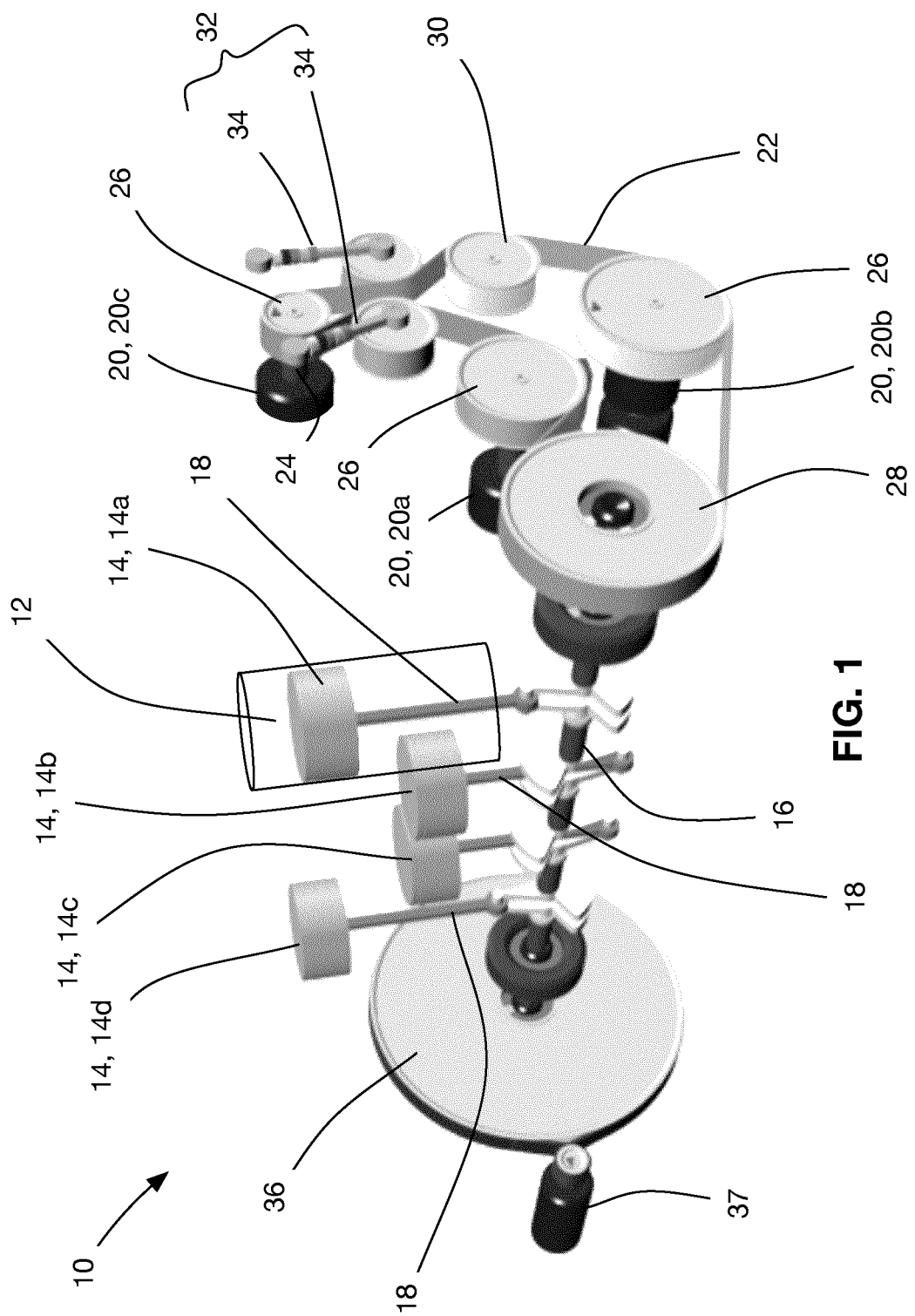
FIG. 1 is a perspective representation of an exemplary internal combustion engine for a vehicle.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Description of Dynamic Problems to be Addressed

Reference is made to FIG. 1, which shows a perspective representation of an example of an internal combustion engine 10 for a vehicle. The engine 10 includes a plurality of cylinders, one of which is represented by a pair of lines, with the reference number 12. In each cylinder 12, a piston 14 reciprocates between a top dead center position and a bottom dead center position. In the view shown in FIG. 1, the pistons shown at 14a and 14d are in the top dead center position and the pistons shown at 14b and 14c are in the bottom dead center position. The engine 10 shown is a four-stroke engine. This means that each piston goes through four 'strokes' for each combustion cycle, including an intake stroke where the piston 14 moves to bottom dead center and air is drawn into the cylinder 12 via one or more intake valves (not shown), a compression stroke where the piston 14 moves to top dead center to compress the air that was drawn in. At an appropriate time, fuel is injected into the cylinder 12 and (in a spark-ignition engine) a spark plug is energized to ignite the fuel. This causes a rapid expansion of the gas in the cylinder 12, driving the piston 14 back to bottom dead center in what is referred to as the expansion stroke. At an appropriate time one or more exhaust valves (not shown) are opened and the piston 14 then returns to top dead center to drive the spent expanded gas from the cylinder 12.

Each piston 14 is connected to the crankshaft, shown at 16, via a connecting rod 18. During the expansion stroke in particular, each piston 14 applies a torque to the crankshaft 16 to drive the crankshaft 16 to rotate. The rotation of the crankshaft 16 is transmitted to the vehicle's driven wheels (not shown). The crankshaft 16 is also used to drive one or more accessories 20, via an accessory drive belt shown at 22. Each accessory 20 has a drive shaft 24 with an accessory pulley 26 thereon. The crankshaft 16 has a crankshaft pulley 28 thereon. The accessory drive belt 22, which is typically a poly V belt, extends around the crankshaft pulley 28 and the accessory pulleys 26 so as to transmit power from the crankshaft pulley 28 to the accessory pulleys 26 in order to drive the accessories 20.

The accessories 20 are shown as simple cylindrical shapes but it will be understood that they could have other shapes as needed. Some examples of accessories 20 that may be driven by the crankshaft 16 include a water pump shown at 20a, an air conditioning compressor shown at 20b, and an MGU (motor-generator unit), shown at 20c. The motor-generator unit 20c may be used as a generator in order to charge the vehicle's battery (not shown), or as a motor so as to transmit torque into the accessory drive belt 22 for various purposes.

Other elements shown in FIG. 1 to be engaged with the accessory drive belt 22 include an idler pulley 30 and a tensioner 32. The tensioner 32 is used to maintain tension on the accessory drive belt 22 in situations where the belt tension would otherwise drop to a level where belt slip could occur. The tensioner 32 shown includes two tensioner arms 34, which engage the accessory drive belt 22 on both sides of the MGU 20c, so as to ensure appropriate belt tension both in situations where the MGU 20c is acting as a generator and in situations where the MGU 20c is acting as a motor.

Another element shown in FIG. 1 that is connected to the crankshaft 16 is a flywheel 36, which is connected to a starter motor 37 and is used to rotate the crankshaft 16 when starting the engine 10.

The torque that is applied to the crankshaft 16 by the pistons 14 may be referred to as the input torque. The input torque is applied at individual points along the crankshaft 16 based on whichever piston 14 is in its expansion stroke. However, the rest of the length of the crankshaft 16 is engaged with elements that are resistant to acceleration such as the flywheel 36, the accessory drive belt 22 due to its connection to the accessories 20, and the other pistons 14 that are not in their expansion stroke. This results in a certain amount of twist in the crankshaft 16 at any given time during operation of the engine 10.

The input torque is not constant, but instead varies cyclically between a peak input torque and a low input torque, based on where the pistons 14 are in their combustion cycles. A problem that can arise from this uneven input torque is that, if the torque peaks from the input torque are applied at a frequency that approaches the natural frequency of the crankshaft 16, this can cause the crankshaft 16 to go into resonance. Once in resonance, the amount of twist that occurs in the crankshaft 16 can increase to the point where the crankshaft 16 fails. Another problem that can arise is that the uneven input torque, if transmitted to the accessory drive belt 22, can then be transmitted from there to the accessories such as the MGU 20c, causing one or more of them to go into resonance, resulting in damage to them.

Figure 2:
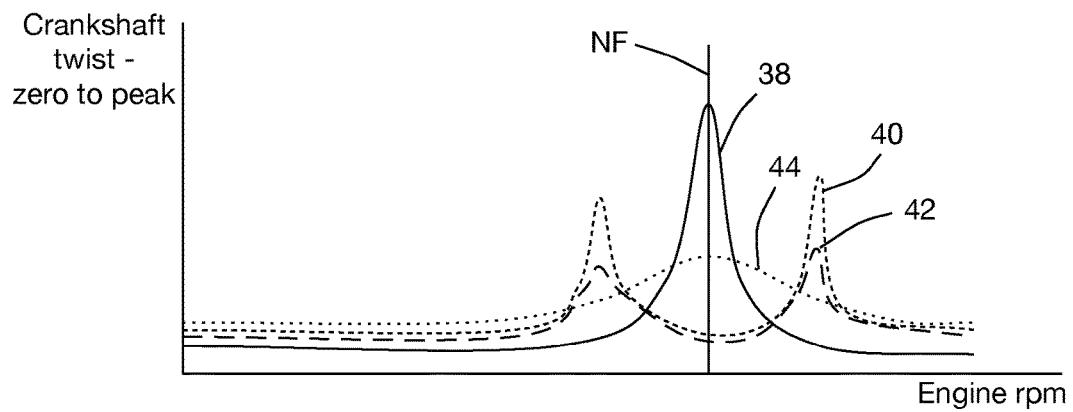
FIG. 2 is a graph showing the peak amplitude of the twist in the crankshaft of FIG. 1.

FIG. 2 shows the peak amplitude of the twist that occurs in the crankshaft 16 of the engine 10 at various RPM of the crankshaft 16. The curve shown at 38 shows the amount of twist that occurs if the crankshaft 16 is not equipped with any device to address the problem. As can be seen, as the RPM of the crankshaft 16 reaches the point where the frequency of the torque peaks approaches the natural frequency (NF) of the crankshaft 16, the amount of twist that occurs in the crankshaft 16 increases quickly.

Description of TVD and Isolator as Separate Concepts

Mounting a device called a TVD (torsional vibration damper) on the crankshaft 16 can address the problem of excessive twist in the crankshaft 16. There are two common types of TVD. One is referred to sometimes as an absorber, and includes a hub that is mounted to the crankshaft, a rubber layer on the outer diameter of the hub, and an inertia member mounted on the rubber layer. As uneven torque is applied to the crankshaft 16 to change the speed of the crankshaft 16, inertia in the inertia member causes the rubber layer to deform. The deformation of the rubber layer results in both the storage of some mechanical energy, and as well in the dissipation of some energy in the form of heat. The presence of the TVD causes the crankshaft 16 to respond to the uneven input torque as represented by the curve 40 in FIG. 2. As can be seen, the peak amplitude of the twist in the crankshaft 16 is reduced when compared to the situation when there is no TVD, which is beneficial for the crankshaft. Additionally, the peak amplitude of the twist occurs both at a lower RPM and at a higher RPM than when there is no TVD. For example, in the example shown in FIG. 2, when there is no TVD on the crankshaft 16, the peak amplitude of the twist occurs at about 6000 RPM. When there is an absorber on the crankshaft 16, the peak amplitude of the twist occurs at 5000 RPM and at 7000 RPM. The engine 10 never reaches 7000 RPM, since its redline (the maximum RPM that the engine's controller will permit) is 6500 RPM. Accordingly, the only peak that needs to be considered is the one at 5000 RPM. It will be appreciated that it is beneficial for the crankshaft 16 to incur the peak amplitude of the twist cyclically at the frequency corresponding to 5000 RPM than at the frequency corresponding to 6000 RPM.

By increasing the amount of energy dissipation that occurs in the rubber (e.g., by selection of a different rubber), it can be seen that the peak amplitude of the twist is reduced further, as represented by the curve shown at 42.

The other common type of TVD is sometimes referred to as a viscous TVD, in which a hub is provided for mounting to the crankshaft 16, and an inertia member resides in a fluid-filled chamber in the hub. The inertia member in a viscous TVD is entirely disconnected from the hub. However, viscous damping takes place during relative movement between the inertia member and the hub. This viscous damping results in a lower peak amplitude of twist than when no TVD is provided, as can be seen in the curve 44 in FIG. 2. However, the peak amplitude of twist is incurred at the same RPM as when there is no TVD provided (e.g., 6000 RPM in FIG. 2). If the viscous TVD is designed to have an increased amount of viscous damping during relative movement between the inertia member and the hub, the peak amplitude of twist can be reduced further.

Mounting a device called an isolator to the crankshaft 16 can address the problem of transmitting torsional vibrations into the accessory drive belt 22. The isolator includes a hub, one or more isolation springs (e.g., arcuate helical compression springs), and a pulley that is rotatable relative to the hub. The one or more springs are tuned to reduce the natural frequency of the external torque load driven by the crankshaft 16 to be below the peak input torque frequency over a selected range of operating conditions for the engine. The external torque load includes the accessory drive belt 22 and all the accessories 20 driven by it, as well as the isolator pulley and the one or more isolation springs. Damping can be provided, e.g., via friction dissipation of energy taking place during relative movement between the hub and the pulley. In general, such damping can be helpful in an isolator so as to inhibit resonance. Too much damping, however, can negatively impact the performance of the isolator since some torque is transferred from the hub to the pulley through the frictional engagement, thereby bypassing the one or more isolation springs. If this damping is excessive, the torsional vibration is no longer attenuated.

Description of Viscous Embodiment Main Components

Figure 3:
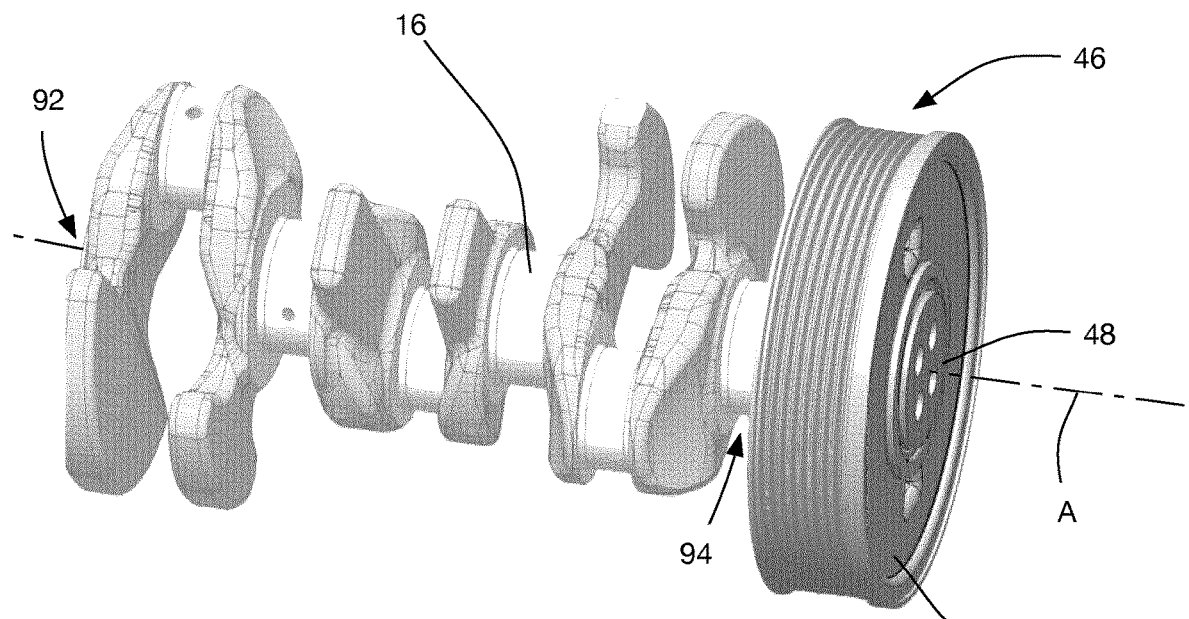
FIG. 3 is a perspective view of the crankshaft and torsional vibration damping device in accordance with an embodiment.

Referring to FIG. 3, the crankshaft pulley 28 is a component of a combined isolation and torsional vibration damping device 46 for the crankshaft 16. The combined isolation and torsional vibration damping device 46 is better able to fit in a confined space and can provide improved performance to prior art devices such as that which is shown in U.S. Pat. No. 6,048,284. The combined isolation and torsional vibration damping device 46 is shown in a perspective view in FIG. 3, in exploded perspective views in FIGS. 4 and 5, and in a sectional view in FIG. 6A. The combined isolation and torsional vibration damping device 46 includes a shaft adapter 48, a rotary drive member 50, at least one isolation member 52, and a torsional vibration damping structure 54.

Figure 7:
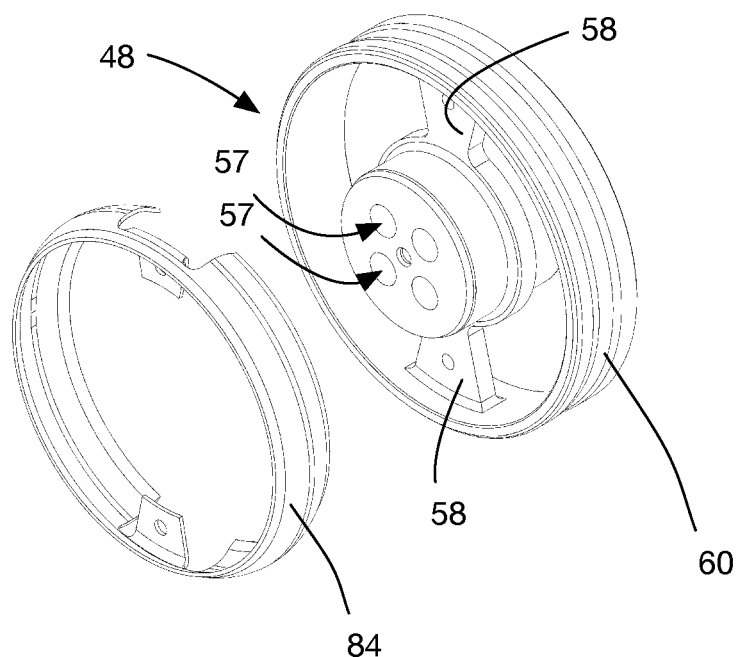
FIGS. 7 and 8 are perspective views of the shaft adapter and the spring shell of the torsional vibration damping device of FIGS. 4 and 5.
Figure 8:
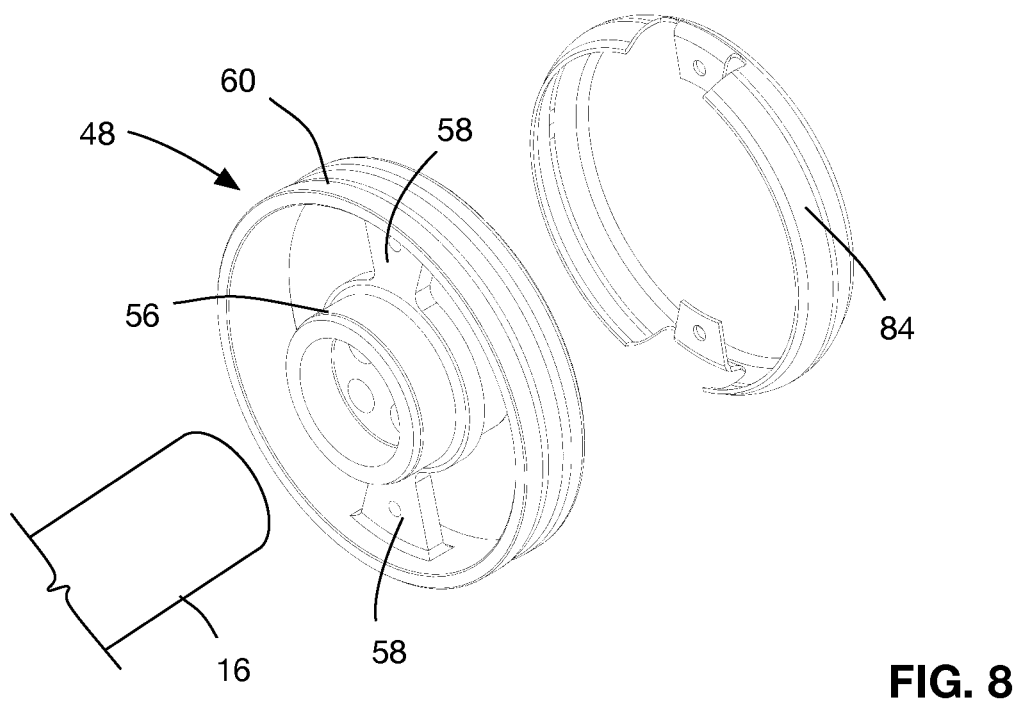

The shaft adapter 48 is shown more clearly in FIGS. 7 and 8 and is connectible to the crankshaft 16 in any suitable way. For example, the shaft adapter 48 in the present example embodiment includes a sleeve portion 56 that fits snugly over an end of the crankshaft 16 and has four pass-through apertures 57 through which fasteners (not shown) can be inserted into receiving apertures in the end of the crankshaft 16. Any other suitable way of mounting the shaft adapter 48 to the crankshaft 16 could be used. The shaft adapter 48 defines an axis A for the combined isolation and torsional vibration damping device 46.

In the example shown, the shaft adapter 48 includes first and second drive arms 58 that will be used to engage the at least one isolation member 52 for torque transmission therewith. The shaft adapter 48 further includes a support 60 for the torsional vibration damping structure 54, which is described further below.

The rotary drive member 50 is, in the present example, the pulley 28 as shown in FIG. 1. However, it will be appreciated that this is but one example of a suitable rotary drive member. In other embodiments, the rotary drive member 50 may be a sprocket that engages a chain that extends to other driven devices, each of which has a sprocket that is engaged with the chain. In still other embodiments, the rotary drive member 50 may be a gear that engages other gears so as to drive additional devices each of which has a gear thereon. In each of these other embodiments, the elements that are driven by the rotary drive member 50 make up the external torque load.

In the embodiment shown, the rotary drive member 50 has a circumferential portion 62, and a first side wall 64 and a second side wall 66 that extend radially inwards from the circumferential portion 62. An exterior drive surface 68 is provided on the circumferential portion and is engageable with the external torque load (i.e., via engagement with the accessory drive belt 22) so as to transmit torque to the external torque load. In the present example, the exterior drive surface 68 is a V-groove face, which is bound by first and second flanges 70 and 72 respectively, which are provided to prevent the accessory drive belt 22 from coming off the rotary drive member 50 during operation.

The rotary drive member 50 at least partially encloses a chamber 74. In the example embodiment shown, the rotary drive member 50 is sealingly engaged with shaft adapter 48 via first and second seal members shown at 76 and 78. The seal members 76 and 78 may be suitable to seal the chamber 74 against fluid leakage out therefrom in embodiments in which the chamber 74 is filled with fluid. Alternatively, the seal members 76 and 78 may be suitable to seal the chamber 74 against the ingress of contaminants into the chamber 74 from the exterior environment.

The rotary drive member 50 is rotatably connected to the shaft adapter 48. In the present embodiment, this is provided in part by the rotary drive member 50 being rotationally supported on torsional vibration damping structure 54 and in part by the sealing engagement by the rotary drive member 50 with the shaft adapter 48 through the first and second seal members 76 and 78.

The at least one isolation member 52, in the present embodiment, includes first and second arcuate helical compression springs 80. As can be understood from FIGS. 4, 5 and 6, the middle of each end of each spring 80 engages one of the drive arms 58, and both sides of each end of each spring 80 engages lugs 82 that are present on the rotary drive member 50. As a result, the springs 80 can transfer torque in both directions; i.e., from the shaft adapter 48 to the rotary drive member 50 and from the rotary drive member 50 to the shaft adapter 48.

Figure 6A:
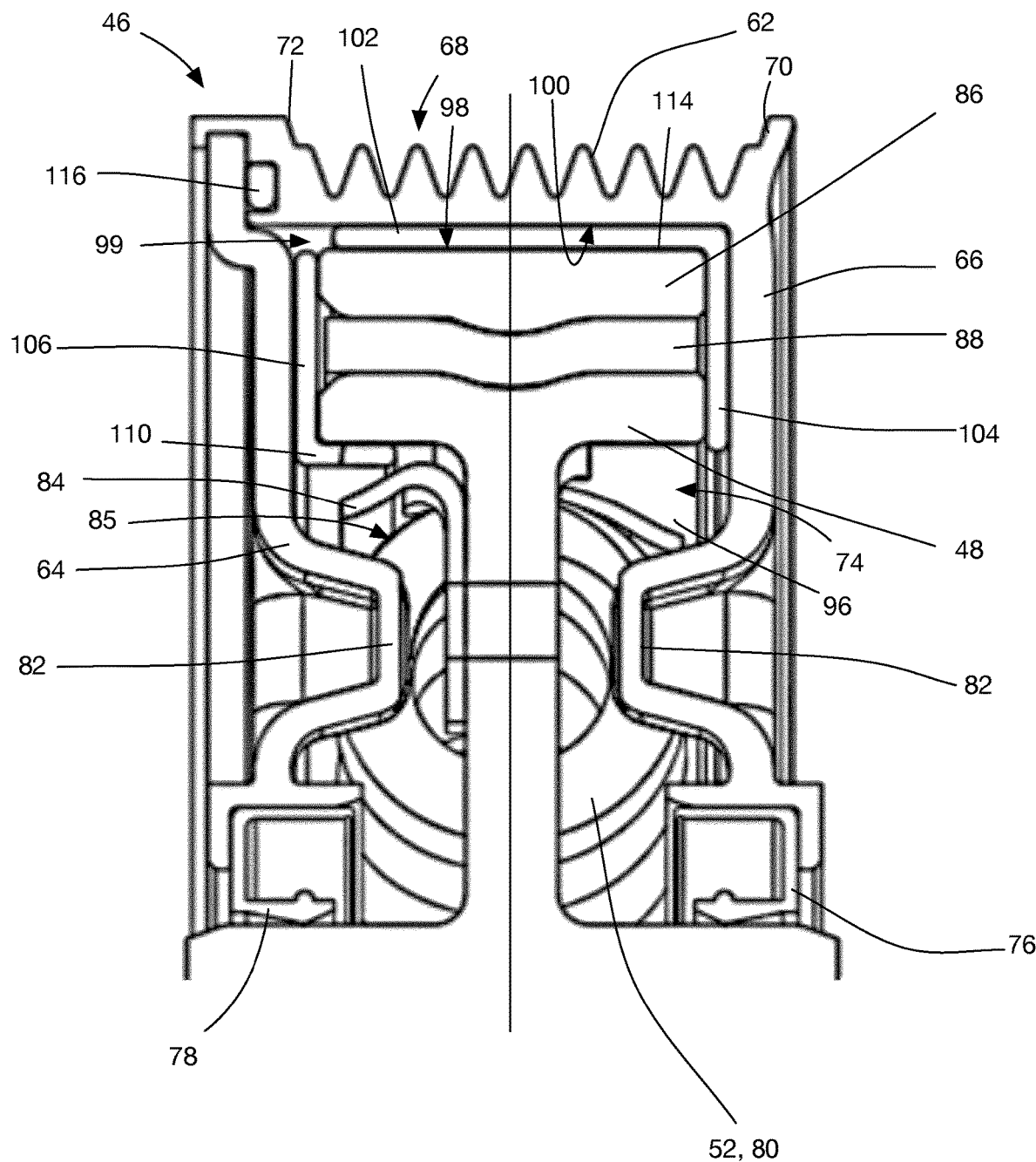
FIG. 6A is a section view of the torsional vibration damping device of FIG. 3.

These springs 80 can be held in a spring shell 84 that is connected to the shaft adapter 48 as shown in FIG. 6A. The spring shell 84 may be formed from any suitable material such as a polymeric material so as to avoid metal-to-metal contact that would otherwise occur with the shaft adapter 48. The spring shell 84 cups the radially outer surface (shown at 85) of the springs 80.

In operation, as described above, the at least one isolation member 52 is tuned to reduce the natural frequency of the external torque load driven by the crankshaft 16 to be below the peak input torque frequency throughout the operating range of RPM of the engine 10, from the RPM at idle to the RPM at the engine's redline. As a result, the external torque load does not go into resonance during the operation of the engine 10 in its operating range of RPM. As described above, the external torque load includes the accessory drive belt 22 and all the accessories 20 and other components driven thereby. In other words, it is everything driven by the rotary drive member 50.

The torsional vibration damping structure 54 includes an inertia member 86, and an elastomeric damping member 88. As can be seen, the inertia member 86 is entirely contained in the chamber 74. The elastomeric damping member 88 is positioned to elastically connect the shaft adapter 48 and the inertia member 86. The inertia member 86 has an inertia i, and the elastomeric damping member 88 has a stiffness k, which are selected based on the natural frequency of the crankshaft 16. The stiffness k and the inertia i are selected to provide the torsional vibration damping structure 54 with a natural frequency that is at least 50% of the natural frequency of the crankshaft 16, and as a result, the movement of the inertia member 86 and the flexure of the elastomeric damping member 88 during operation of the engine 10 reduces the peak amplitude of twist that is incurred by the crankshaft 16. The selection of the stiffness k and the inertia i is described in more detail further below.

As uneven torque is applied to the crankshaft 16 to change the speed of the crankshaft 16, inertia in the inertia member 86 causes the elastomeric damping member 88 to deform. The deformation of the elastomeric damping member 88 results in both the storage of some mechanical energy, and also in the dissipation of some energy in the form of heat. In addition, a supplemental damping structure 90 is provided for the combined isolation and torsional vibration damping device 46. The supplemental damping structure 90 is contained in the chamber 74 and applies a supplemental damping torque to resist relative movement between the rotary drive member 50 and the inertia member 86 in addition to damping provided by the elastomeric damping member. The supplemental damping torque, the inertia i of the inertia member 86, and the stiffness k of the elastomeric damping member 88 are selected such that, during use of the crankshaft 16 (i.e., during operation of the engine 10), a sum of torques (referred to as Tcorr) applied to the shaft adapter 48 from a plurality of torque sources including the supplemental damping torque (referred to as Tsupp), a torque from viscous damping within the elastomeric damping member 88 (referred to as Tedmv), a torque from elastic deformation of the elastomeric damping member 88 (referred to as Tedme), and a torque from the inertia in the inertia member 86 (referred to as Ti), opposes a torque applied to the shaft adapter 48 from the crankshaft 16 (referred to as Tinput) at a natural frequency of the crankshaft 16 with the combined isolation and torsional vibration damping device 46 thereon, and limits a maximum twist (also referred to as the peak amplitude of twist) between a first end (shown at 92) of the crankshaft 16 and a second end (shown at 94) of the crankshaft 16, to below a yield point of the crankshaft 16.

The supplemental damping structure 90 may provide the supplemental damping torque in any suitable way. In the embodiment shown in FIG. 6A, the supplemental damping structure 90 provides a viscous damping torque. To achieve this, the chamber 74 is filled with a damping fluid 96 and the inertia member 86 has a damping fluid engagement surface 98 that travels through the damping fluid 96 during relative movement between the rotary drive member 50 and the shaft adapter 48 so as to cause viscous damping between the inertia member 86 and the rotary drive member 50. The clearances between the damping fluid engagement surface 98 of the inertia member 86 and the corresponding inner surfaces of the rotary drive member 50 are selected so as to be suitable for viscous damping therebetween based on the viscosity of the damping fluid 96. The viscosity of the damping fluid 96 is selected so as to provide the selected supplemental damping torque during relative movement between the inertia member 86 and the rotary drive member 50.

A radially outer support layer 99 is positioned radially between the inertia member 86 and a radially inner surface 100 of the rotary drive member 50 in the chamber 74, which supports the rotary drive member 50 on the shaft adapter 48. In the embodiment shown in FIG. 6A, the radially outer support layer 99 includes a bushing 102 that is made from a suitable polymeric material so as to prevent metal-to-metal contact between the inertia member 86 and the rotary drive member 50. In some embodiments, the bushing 102 shown in FIG. 6A is not fixedly connected to either the rotary drive member 50 or the inertia member 86 and is slidable relative to both the rotary drive member 50 and the inertia member 86. In other embodiments, the bushing 102 is fixedly connected to the rotary drive member 50 and is slidably engaged with the inertia member 86. In some other embodiments, the radially outer support layer 99 may not be a bushing 102, but may instead be a coating that is applied to the radially inner surface 100 of the rotary drive member 50. In yet another embodiment, it is at least possible for the bushing 102 (or more broadly, the radially outer support layer 99) to be fixedly connected to the inertia member 86 and to be slidably engaged with the rotary drive member 50.

A first side support layer 104 is positioned axially between the inertia member 86 and the second side wall 66 of the rotary drive member 50. The first side support layer 104 may be integral with the bushing 102. A second side support layer 106 is positioned axially between the inertia member 86 and the first side wall 64 of the rotary drive member 50. The second side support layer 106 may itself be integrally joined with a radially inner engagement layer 110 that is engaged with a radially inner surface on the shaft adapter 48.

During operation of the embodiment shown in FIG. 6A, a thin film of damping fluid 96 is provided between the radially outer support layer 99 and the inertia member 86, and between the radially outer support layer 99 and the radially inner surface 100 of the rotary drive member 50, and provides viscous damping during relative movement between the inertia member 86 and the rotary drive member 50. Additionally, based on the clearances provided between the inertia member 86 and the first side support layer 104 and between the first side support layer 104 and the rotary drive member 50, suitably sized films of damping fluid may be present at those two interfaces also, and so viscous damping may arise there as well.

The first side wall 66 is shown as a separate member that is engaged with a mounting face on the remainder of the rotary drive member 50 wherein a seal member 116 (e.g. an o-ring) is provided in a channel in at least one of the first side wall and the mounting face, wherein an surrounding wall is bent over the first side wall to hold it axially in place. The edge face of the first side wall includes projections which form valleys in the surrounding wall when the first side wall is inserted into engagement with the mounting face. Optionally the projections are on the surrounding wall and form valleys in the first side wall. The projections may be formed any suitable way such as by knurling the appropriate surface of the edge face or the surrounding wall surface.

Thus, the supplemental damping structure 90 shown in FIG. 6A may be referred to as a viscous damping structure and includes the surfaces that are slidably engaged with one another via the damping fluid 96 and in which viscous damping is generated.

When designing the combined isolation and torsional vibration damping device 46 for the crankshaft 16, the size of the rotary drive member 50 is typically provided by the purchaser of the combined isolation and torsional vibration damping device 46, having been determined based on other engine considerations and at least somewhat independent of any consideration regarding a TVD. The size of the crankshaft pulley 28 is typically not subject to change simply to facilitate the design process for the TVD or isolator. Thus, the diameter of the rotary drive member 50 is typically prespecified. By configuring the supplemental damping structure so as to provide a selected supplemental damping torque while ensuring that the above-noted three conditions are met, (namely that: 1. The natural frequency of a system made up of the external torque load (i.e., the accessory drive belt 22 and all the accessories and components (i.e., the tensioner 32 and the idler pulley 30) engaged therewith), and all portions of the combined isolation and torsional vibration damping device 46 which transmit torque from the shaft adapter 48 to the external torque load, is below the peak input torque frequency throughout the operating range of RPM of the engine 10, from the RPM at idle to the RPM at the engine's redline; 2. The stiffness k and the inertia i are selected to provide the torsional vibration damping structure 54 with a natural frequency that is at least 50% of the natural frequency of the crankshaft 16, and as a result, the movement of the inertia member 86 and the flexure of the elastomeric damping member 88 during operation of the engine 10 reduces the peak amplitude of twist that is incurred by the crankshaft 16; and 3. The sum of torques applied to the shaft adapter 48 from the plurality of torque sources including the torque Tsupp, the torque Tedmv, the torque Tedme, and the torque Ti, opposes the torque Tinput at a natural frequency of the crankshaft 16 with the combined isolation and torsional vibration damping device 46 thereon, and limits a maximum twist between the first end 92 of the crankshaft 16 and the second end 94 of the crankshaft 16, to below a yield point of the crankshaft 16), the inertia member 86 can be sized to fit inside the rotary drive member 50 having the prespecified diameter.

Discussion of the Equations Governing the Torques

The various torques noted above are calculated as follows: The torque Ti applied to the shaft adapter 48 by the inertia member 86 can be expressed as:

$$Ti = i\alpha,$$

wherein i is the inertia of the inertia member 86, and a is the angular acceleration of the inertia member 86.

The torque resulting from viscous damping within the elastomeric damping member 88 can be expressed as:

$$Tedmv = Cr(\omega_{im} - \omega_{sa}),$$

wherein Cr is a constant, $\omega_{im}$ is the angular velocity of the inertia member 86 and $\omega_{sa}$ is the angular velocity of the shaft adapter 48. The constant Cr can be determined by the following equation:

$$c_r = 4\pi\zeta f_n i,$$

wherein $\zeta$ is the damping ratio and is determined as follows:

$$\varsigma = \frac{1}{2}\sqrt{\frac{1}{MR^2 - 1}},$$

wherein MR is called the magnification ratio and is the ratio between an amplitude of movement in the shaft adapter 48 compared to a resultant amplitude of movement in the inertia member 86, and wherein:

$$f_n = \frac{1}{2\pi}\sqrt{\frac{k}{i}},$$

wherein, as noted above, k is the stiffness in the elastomeric damping member 88 and i is the inertia of the inertia member 86. $f_n$ is the natural frequency of the torsional vibration damping structure 54, which is selected based on the natural frequency of the crankshaft 16. Preferably, the natural frequency of the torsional vibration damping structure 54 is selected to approximately match the natural frequency of the crankshaft 16 with all the components it will have mounted thereon in use, including the flywheel 36, and a mass that is equivalent to the estimated mass of the combined isolation and torsional vibration damping device 46. This has been found to provide a close match between the natural frequency of the torsional vibration damping structure 54 and the crankshaft 16 with all the actual components it has mounted thereon, during actual use.

The torque resulting from elastic deformation in the elastomeric damping member 88 can be expressed as:

$$Tedme = k(\theta_{im} - \theta_{sa}),$$

wherein k is the stiffness in the elastomeric damping member 88, $\theta_{im}$ is the angular displacement of the inertia member 86, and $\theta_{sa}$ is the angular displacement of the shaft adapter.

The supplemental torque Tsupp, in the embodiment in which the damping is viscous damping, can be expressed as:

$$T_{supp} = c_v(\omega_{rdm} - \omega_{im}),$$

wherein Cv is a constant related to the viscosity of the damping fluid 96, $\omega_{rdm}$ is the angular velocity of the rotary drive member 50, and $\omega_{im}$ is the angular velocity of the inertia member 86.

The relationships between these equations will now be explored. By increasing the supplemental damping torque Tsupp, and reducing the inertia (e.g., with a goal of fitting the inertia member 86 inside the chamber 74), it can be seen that the torque Ti would decrease. Additionally, the decrease in the inertia i reduces the torque Tedmv. Furthermore, as a result of the decrease in the inertia I, the stiffness k of the elastomeric damping member 88 may need to be adjusted downwards in order to ensure that the natural frequency of the torsional vibration damping structure 54 is maintained at a desired value. Reducing the stiffness k of the elastomeric damping member 88, however, decreases the torque Tedme. Additionally, reducing the stiffness k will impact the magnification ratio MR, which affects the speed and displacement of the inertia member 86. This further reduces the torques that depend on the angular speed and angular displacement of the inertia member, which includes the torques Tsupp, Tedmv, and Tedme.

Based on the above, it can be seen that there is no simple equation that can be readily derived to relate a selected change in the supplemental damping torque with a resultant change in the inertia, while maintaining the overall corrective torque Tcorr. As a result, designing the combined isolation and torsional vibration damping device 46 has been found to be best done as an iterative process, using appropriate mathematical modeling software to determine the effects of changing certain values for the supplemental torque and the inertia of the inertia member 86.

Figure 9:
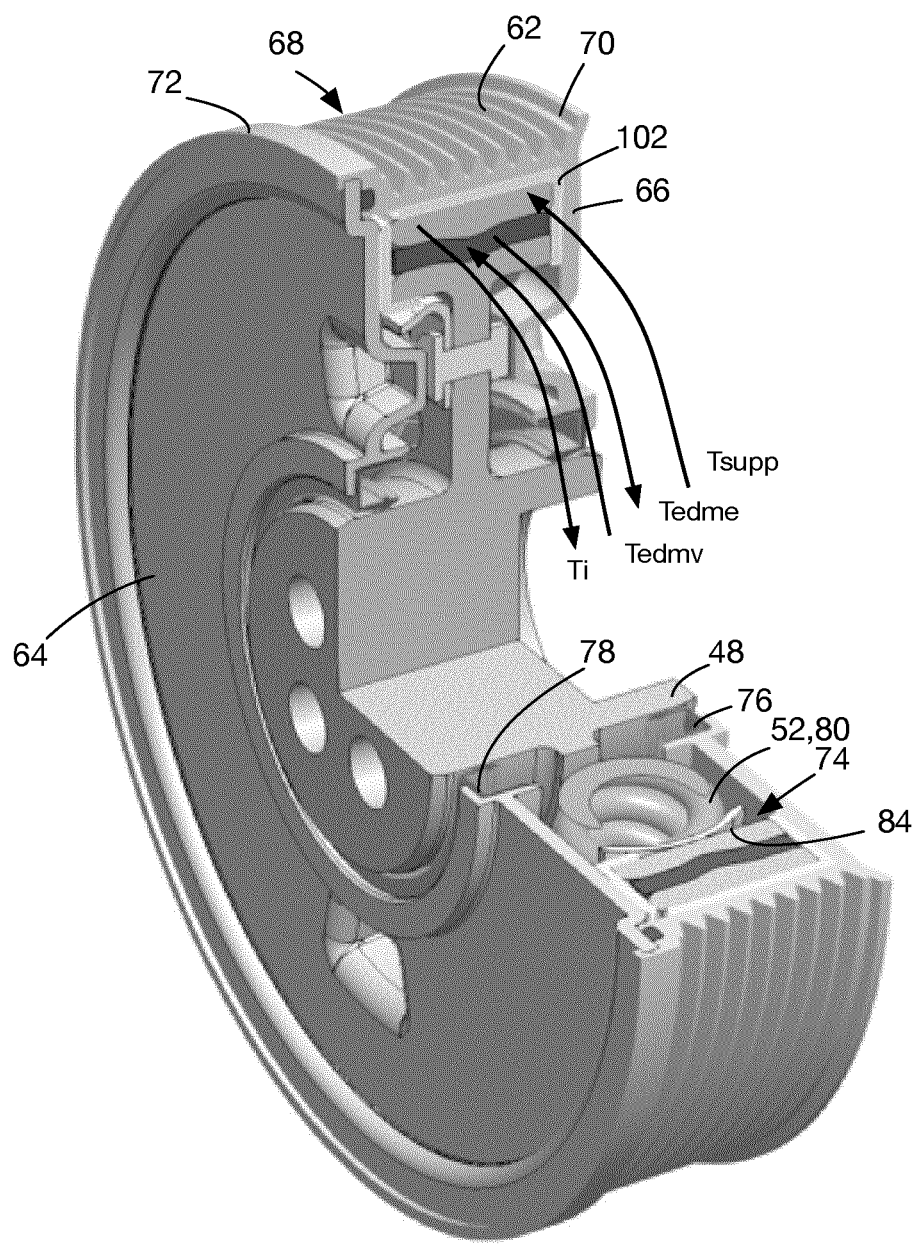
FIG. 9 is a perspective section view of the torsional vibration damping device of FIGS. 4 and 5.

FIG. 9 is a perspective view of the combined isolation and torsional vibration damping device 46 with a cutaway section, with the various torques described above illustrated. As can be seen, while the sum of these torques may oppose the torque Tinput at least some of the time, it can be seen that these torques may individually oppose one another, depending on the specifics of the situation at the instant they are assessed.

Figure 10:
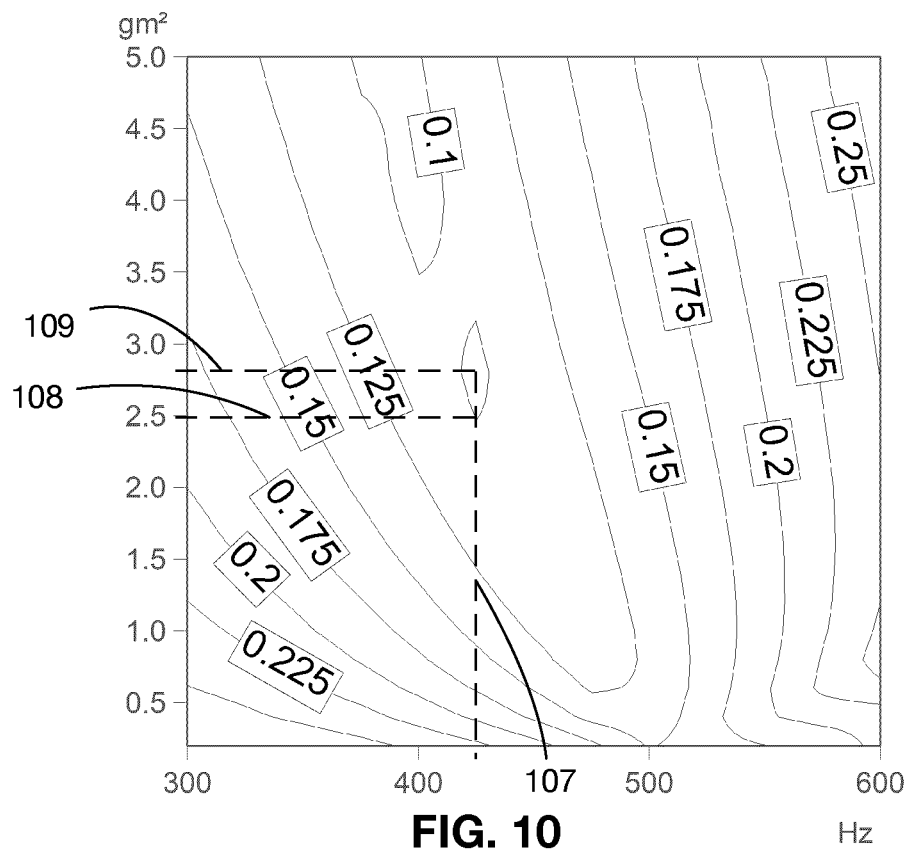
FIG. 10 is a graph showing the relationship between the frequency of the peak input torque, the inertia of the inertia member, and the resultant maximum twist in the crankshaft using the torsional vibration damping device of FIGS. 4 and 5.
Figure 11:
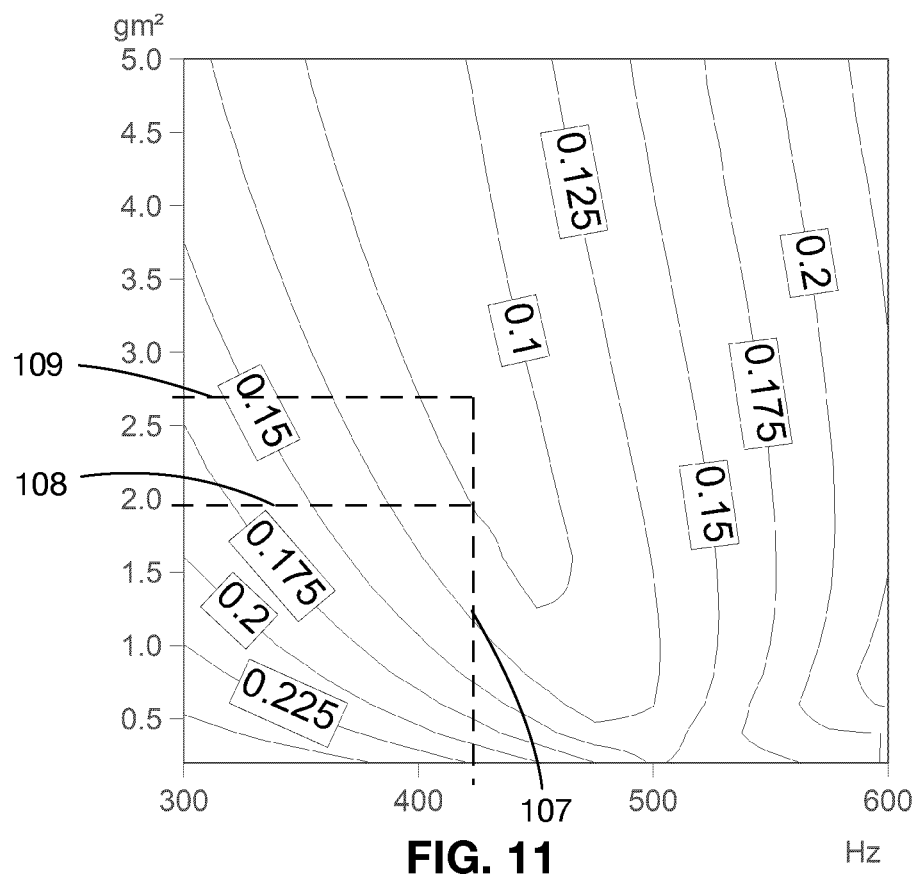
FIG. 11 is a graph similar to that of FIG. 10, but with a damping ratio of 0.125.
Figure 12:
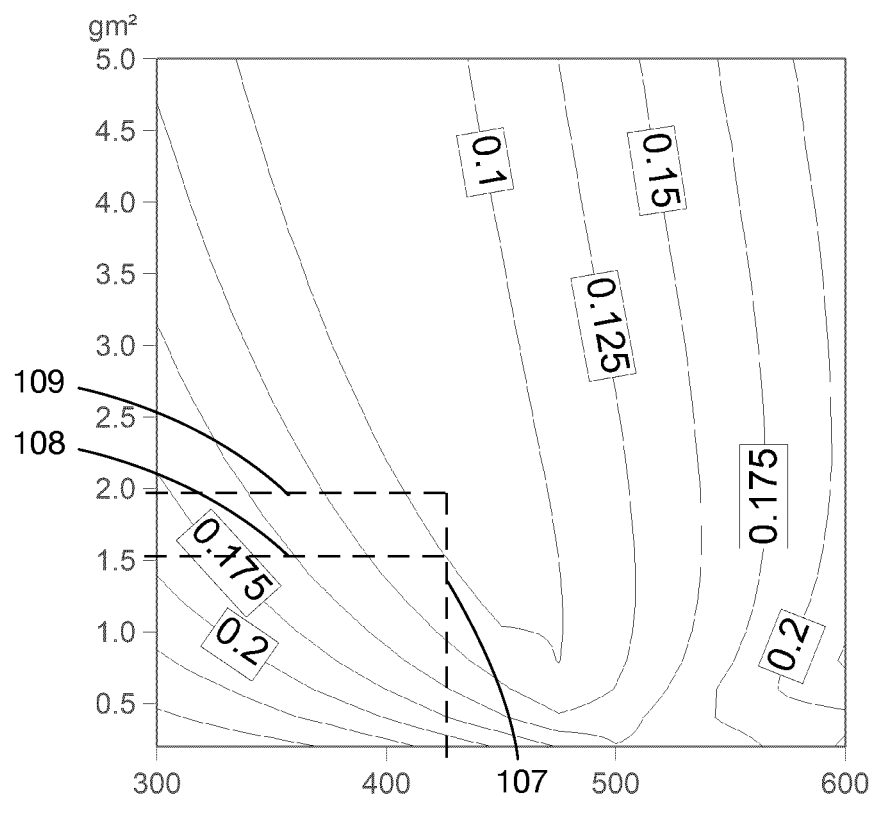
FIG. 12 is a graph similar to that of FIGS. 10 and 11, but with a damping ratio of 0.15.

Using certain mathematical modeling software, an example of the combined isolation and torsional vibration damping device 46 was analyzed for different amounts of supplemental damping, and in comparison with a version of the combined isolation and torsional vibration damping device 46 without any supplemental damping. The results are illustrated in FIGS. 10-12. It will be noted that, one of the performance criteria that would be provided to the provider of the combined isolation and torsional vibration damping device 46 is a maximum permissible twist in the crankshaft 16. For example, in an example, a purchaser of the combined isolation and torsional vibration damping device 46 may specify that the maximum twist incurred in the crankshaft 16 may not exceed 0.1 degrees. Additionally, in this example, it is known that the natural frequency of the cs 16 is 425 Hz. For greater clarity, it will be understood that the relationship between the RPM of an engine and the peak input torque frequency is:

$$Fp = (RPM \times order)/60,$$

wherein Fp is the peak input torque frequency, RPM is the engine speed in RPM, and 'order' is the order of the engine, which is the number of times the peak torque is applied to the crankshaft 16 for every revolution of the crankshaft 16. For the engine 10 shown in FIG. 1, which has four cylinders, the order of the engine is 2. For this engine, the natural frequency of the crankshaft 16 is reached when the engine 10 is at 4800 RPM.

FIG. 10 is a graph that shows the relationship between the frequency of the peak input torque (i.e., the peak input torque frequency), the inertia of the inertia member 86, and the resultant maximum twist in the crankshaft 16, where the combined isolation and torsional vibration damping device 46 has a damping ratio of 0.1. This damping ratio is achieved with the elastomeric damping member 88 alone. Accordingly, FIG. 10 is the performance graph of the combined isolation and torsional vibration damping device 46 where the supplemental damping torque is zero. The contour lines on the graph surround regions where the maximum twist in the crankshaft 16 does not exceed the value shown in the contour line. As can be seen in the graph, the minimum possible inertia needed to achieve less than the required 0.1 degrees of maximum twist at 425 Hz, is 2.5 gm^2, based on the intersection of the 425 Hz line shown at 107 and the 0.1 degree contour line. Line 108 is an indicator line that directs the reader to the inertia that is required to provide this maximum twist (i.e., 2.5 ^2, as mentioned) above. However, in order to achieve this, every manufacturing detail relating to the combined isolation and torsional vibration damping device 46 would need to be essentially perfect, with no room for any tolerance. Since this is not normally possible, it is prudent to select an inertia at which there is some room for tolerances in the manufacture of the various components of the combined isolation and torsional vibration damping device 46. As can be seen by extending the line 425 Hz line upwards, this would correspond to a selection of an inertia of about 2.8 gm^2. It will be noted, however, that even at this inertia, there is very little room for tolerance in the manufacture of the combined isolation and torsional vibration damping device 46, and accordingly, it might not be possible to profitably build such a combined isolation and torsional vibration damping device 46 in large numbers due to the difficulty in maintaining the tight tolerances that would ensure that the maximum twist in the crankshaft 16 remains less than the maximum permitted frequency.

FIG. 11 is a graph for the same combined isolation and torsional vibration damping device 46, but with a damping ratio of 0.125, which is achieved using both the damping in the elastomeric damping member 88 and damping from the supplemental damping structure 90. As can be seen, the region in which the maximum twist 48 is less than 0.1 degrees extends farther down in FIG. 11. As a result, the minimum inertia that would permit the maximum twist to remain less than 0.1 degrees drops to 2 gm^2. The inertia at which there is some tolerance in the manufacture of the combined isolation and torsional vibration damping device 46 is again at 2.8 gm^2, however, it can be seen that there is significantly more tolerance available in the manufacture of the combined isolation and torsional vibration damping device 46 here.

FIG. 12 is a graph for the same combined isolation and torsional vibration damping device 46, but with a damping ratio of 0.15, which is again achieved using both the damping in the elastomeric damping member 88 and damping from the supplemental damping structure 90. As can be seen by the lines 107, 108 and 109, the minimum inertia needed to provide a maximum twist of less than 0.1 degrees is just over 1.5 gm^2, and a suitable inertia that permits some tolerance in the manufacture of the combined isolation and torsional vibration damping device 46 would be 2 gm^2.

Since the damping ratio is related to the amount of supplemental damping that is provided, it can be seen that, as the amount of supplemental damping increases, the amount of inertia needed for the combined isolation and torsional vibration damping device 46 to perform acceptably drops. However, it will also be noted that, while the supplemental damping torque Tsupp is transmitted to the shaft adapter 48 due to the viscous damping provided by the damping fluid 96, the supplemental damping torque is also transmitted into the rotary drive member 50, and thus acts as a damping torque that must be considered when assessing the performance of the combined isolation and torsional vibration damping device 46 in isolating the accessory drive belt 22 from the torsional vibrations at the crankshaft 16. In other words, the supplementary damping structure 90 transmits torque in parallel with the at least one isolation member 52 between the shaft adapter 48 and the rotary drive member 50, which impacts the performance of the combined isolation and torsional vibration damping device 46 as an isolator. Thus, during the design process, the supplementary damping torque that is generated must be controlled so as permit the at least one isolation member 52 to effectively isolate the accessory drive belt 22 from the crankshaft 16.

Discussion of Friction-Based Embodiment

Figure 6B:
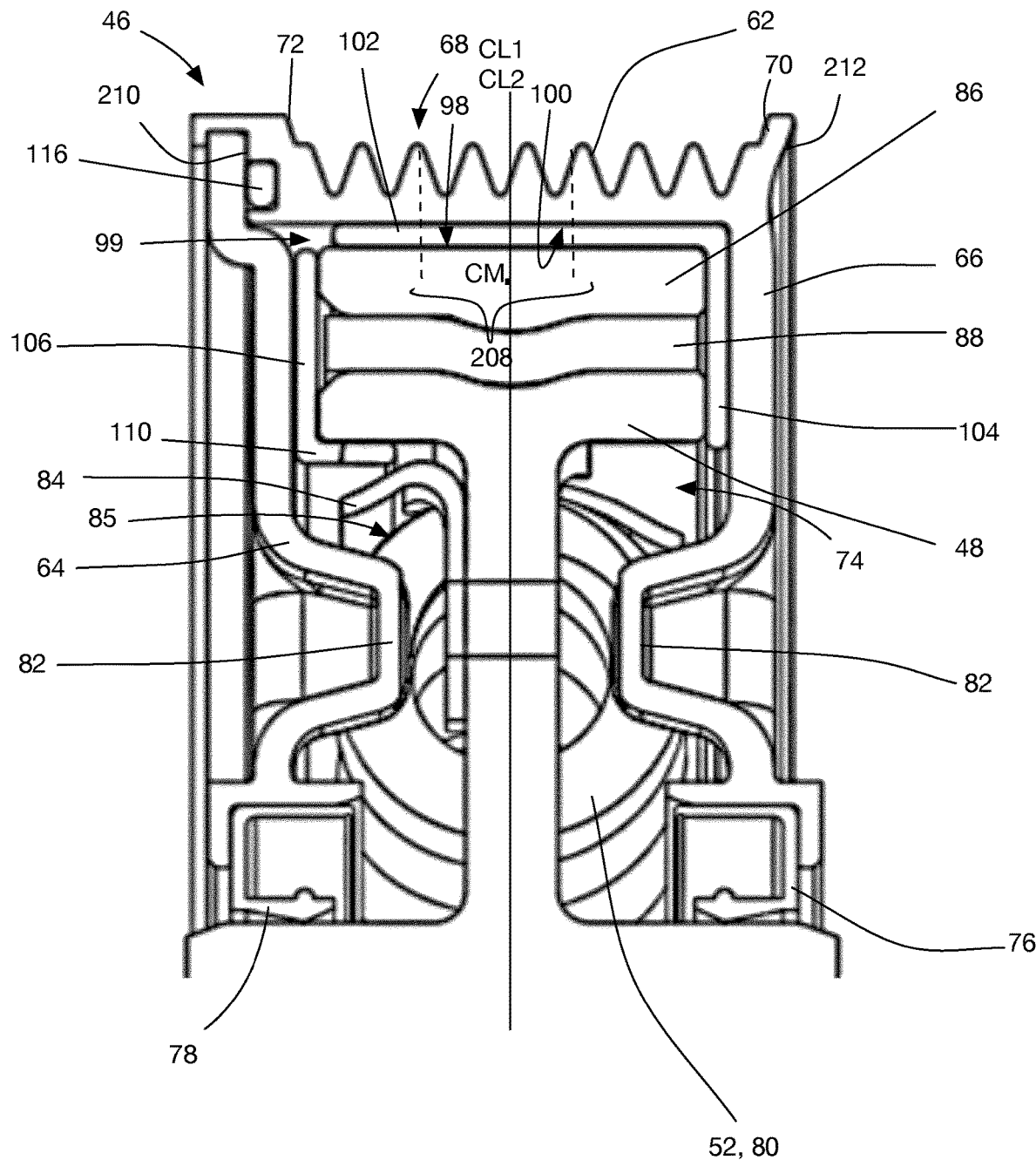
FIG. 6B is a section view of the torsional vibration damping device of FIG. 3 in accordance with a variant.

As noted above, FIG. 6A shows an embodiment in which a damping fluid is provided in the chamber 74 and the chamber is therefore sealed against leakage of damping fluid out therefrom. FIG. 6B illustrates a variant of the embodiment shown in FIG. 6A. In the embodiment shown in FIG. 6B, the supplementary damping structure 90 is configured to provide frictional damping between the rotary drive member 50 and the inertia member 86 and may thus be referred to as a frictional damping structure. The frictional damping that is generated by the frictional damping structure 90 results in a torque according to a different equation than the torque provided by the viscous damping structure described in relation to FIG. 6A. The equation governing the frictional damping torque is:

$$T_f = \mu r F_N,$$

wherein $\mu$ is the overall coefficient of friction between the frictionally engaged surfaces (which are described further below), r is the radius at which the friction force is being applied and $F_N$ is the normal force applied between the frictionally engaged surfaces In the embodiment shown in FIG. 6B, the chamber 74 is not filled with a damping fluid. The frictional damping structure includes a first friction surface arrangement 200 and a second friction surface arrangement 202 that is slidingly engageable with the first friction surface arrangement 200 during relative movement between the inertia member 86 and the rotary drive member 50, thereby generating frictional damping based on the overall coefficient of friction $\mu$ between the first friction surface arrangement 200 and the second friction surface arrangement 202. The overall coefficient of friction $\mu$ is selected so as to provide the selected supplemental damping torque Tsupp, in order for the combined isolation and torsional vibration damping device 46 to meet the above-noted three conditions. In the embodiment shown in FIG. 6B, the radially outer support layer 99 may be referred to as a radially outer frictional engagement layer 99 which is positioned radially between the inertia member 50 and the radially inner surface 100 of the rotary drive member 50 in the chamber 74. The radially outer frictional engagement layer 99 is slidingly engageable with at least one of the rotary drive member 50 and the inertia member 86 so as to generate friction.

Optionally, the radially outer frictional engagement layer 99 is a bushing (i.e. bushing 102) that is slidable relative to both the rotary drive member 50 and to the inertia member 86, or alternatively is fixedly connected to one of the rotary drive member 50 and the inertia member 86 and is slidably engaged with the other of the rotary drive member 50 and the inertia member 86. Where there is sliding engagement between the radially outer frictional engagement layer 99 and the radially outer surface (shown at 204) of the inertia member 86, the radially outer surface 204 may be considered to be included in the first friction surface arrangement 200 and the mutually engaged surface of the radially outer frictional engagement layer 99 (shown at 206). As a further option, the first side support layer 104 may be a first side frictional engagement layer and the second side frictional engagement layer 106 may be a second side frictional engagement layer. Each of the first and second side frictional engagement layers 104 and 106 is slidingly engageable with at least one of the rotary drive member 50 and the inertia member 86 so as to generate friction. It will be understood that the radius r referred to in the equation above in relation to the frictional damping torque is an average or effective radius based on the positions of the surfaces that make up the first and second friction surface arrangements 200 and 202.

It will be noted that in the embodiment shown in FIG. 6B, the elastomeric damping layer 88 is recessed axially from the inertia member 86 so as to prevent contact between the elastomeric damping layer 88 and the first and second side frictional engagement layers 104 and 106. It is particularly beneficial for this feature to be provided in the embodiment in FIG. 6B due to the lack of any damping fluid between the elastomeric damping member 88 and the first and second side frictional engagement layers 104 and 106.

In a preferred embodiment, the exterior drive surface 68 has an axial length L1 and has a geometric center that has a geometric center axial position represented by line CL1. The inertia member 86 has a center of mass $CM_{IM}$ that has a center of mass axial position (represented by line CL2) that is approximately the same as the geometric center axial position. For the purposes of the present disclosure, the center of mass axial position (represented by line CL2) being approximately the same as the geometric center axial position means that the center of mass axial position is within the middle one-third of the axial length of the exterior drive surface 68. The middle one-third of the axial length L1 is shown at 208. By providing this level of centeredness, several advantages arise. Firstly, much of the load that is exerted on the crankshaft pulley 28 from the engagement of the exterior drive surface 68 with the accessory drive belt 22 is transmitted evenly into radially outer frictional engagement layer 99 and into the inertia member 86. This load provides the normal force for the mutually facing surfaces between the bushing 102 and the radially outer surface 204 of the inertia member 86 and between the bushing 102 and the radially inner surface 100 of the rotary drive member 50, so as to generate friction between whichever of these mutually facing surfaces are slidably engaged with one another. It will be noted that this normal force is included in the normal force $F_N$ in the equation above, but the normal force $F_N$ is an average or effective normal force that takes into account all the surfaces that make up the first and second friction surface arrangements 200 and 202. However, by approximately centering the normal force on the crankshaft pulley 28 on the inertia member 86, the distribution of the friction force may be more even across the inertia member 86 and the bushing 102, and, in at least some embodiments, more of the load from the accessory drive belt 22 is used to generate friction, than it is for certain proposed devices of the prior art. Additionally, when the axial position of the center of mass CM of the inertia member 86 is not within the middle one-third of the axial length L1, it is possible that the stresses incurred by the bushing 102 are so severe that the bushing 102 is subject to relatively rapid failure, depending on its material of manufacture. To address this a bushing 102 made from a relatively more expensive material can be used, in embodiments where the center of mass CM of the inertia member 86 is not within the middle one-third of the axial length L1, as needed. For example the bushing 102 could, if needed, be formed with a metallic (e.g. steel) core with coatings of nylon and PTFE on its radially inner and radially outer faces. However, if the inertia member 86 is centered as described above, then the bushing 102 may be made simply from nylon and PTFE (or any other suitable material).

In the embodiment shown in FIG. 6B (and also in the embodiment shown in FIG. 6A), it can be seen the rotary drive member 50 is a pulley (i.e. crankshaft pulley 28) and the exterior drive surface 68 is bound by the first flange 70 and the second flange 72. The first flange 70 has a first flange axially exterior face 210, and the second flange 72 has a second flange axially exterior face 212. It can be seen that the inertia member 86 extends axially, fitting between the first flange axially exterior face 210 and the second flange axially exterior face 212. This permits all of the load from the belt 22 to be transmitted to the mutually facing radially outer and inner friction surfaces of the bushing 102, the inertia member 86 and the rotary drive member 50.

Figure 13:
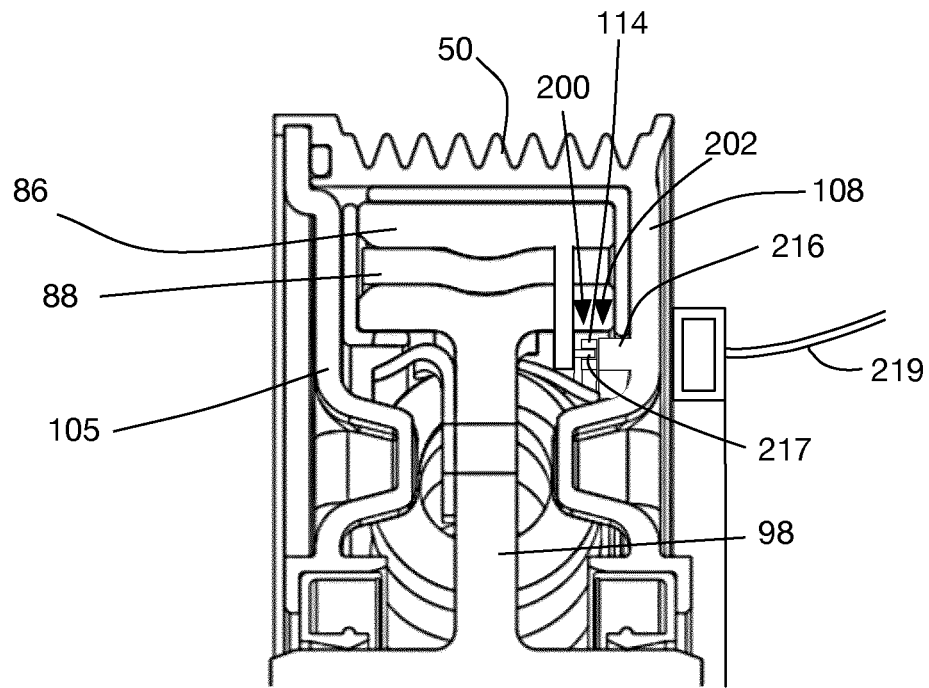
FIG. 13 is a section view of a torsional vibration damping device in accordance with another embodiment.

Reference is made to FIG. 13, which shows an alternative structure for the first and second friction surface arrangements 200 and 202. In this embodiment, the first friction surface arrangement 200 includes a first friction plate 214 and the second friction surface arrangement 202 includes a second friction plate 216 that moves rotationally relative to the first friction plate 214 during relative movement between the inertia member 86 and the rotary drive member 50. The first friction plate 214 is shown rotationally connected to the inertia member 214 but is slidably mounted on axially extending pins 217 on the inertia member 86 and therefore is axially movable relative to the inertia member 214. The second friction plate 216 is shown integrally connected to the second side wall 66 of the rotary drive member 50.

A frictional force acting between the first friction plate 214 and the second friction plate 216 is adjustable via an electric current, and generates a torque that is included in the frictional damping torque.

In the embodiment shown in FIG. 13, a stationary electromagnetic coil 218 is provided with an electrical conduit 219 connected thereto to transmit an electric current to the electromagnetic coil 218 from a power source (e.g. a vehicle battery). Energization of the electromagnetic coil 218 draws the first friction plate 214 towards the second friction plate 216. The second friction plate 216 is integrally formed with the second side wall 108 of the rotary drive member 50. Optionally, the electromagnetic coil 218 is in direct sliding contact with the second side wall 66 of the rotary drive member 50 and generates a magnetic flux through the second side wall 66, through the second friction plate 216 and into the first friction plate 214 in order to draw the first friction plate 214 into engagement with the second friction plate. Adjusting the electric current adjusts the force of engagement between the first and second friction plates 214 and 216 and therefore adjusts the frictional damping force and therefore adjusts the frictional damping torque. In this way, the frictional damping torque can be adjusted to be higher when the RPM of the engine approaches the point where the peak input torque frequency approaches the natural frequency of the crankshaft 16 assembly during use (i.e. with whatever components are mounted to it during use such as the flywheel 36 and the combined isolation and torsional vibration damping device 46) and lower at other times, as appropriate in order to maintain the three conditions identified above.

Optionally a biasing member (not shown) may be provided to urge the first friction plate 214 away from the second friction plate 216 when the electromagnetic coil 218 is deenergized.

Figure 14:
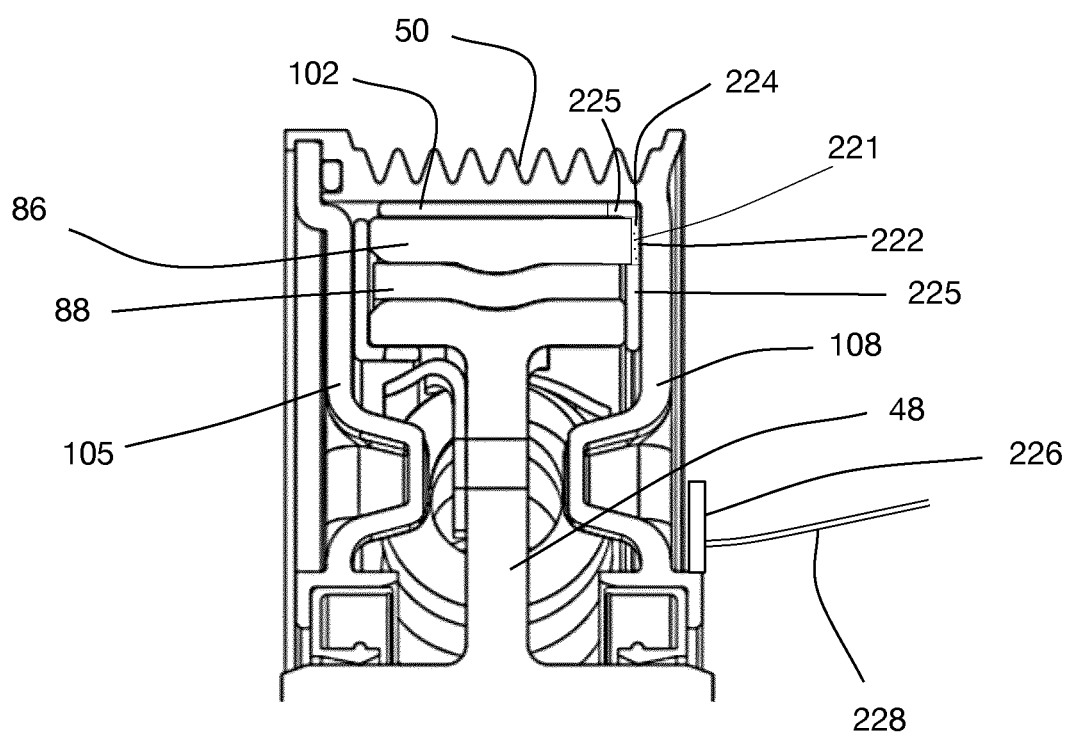
FIG. 14 is a section view of a torsional vibration damping device in accordance with yet another embodiment.

Reference is made to FIG. 14, in which the supplemental damping structure 90 includes a particle clutch 220 that is adjustable via an electric current. The particle clutch 220 includes particles (shown at 221) that may optionally reside in a suitable fluid 222 if needed, in a chamber 224 defined between the inertia member 86 and the rotary drive member 50. Suitable seal members 225 are provided to assist in sealing the chamber 224 against leakage of particles 221 and fluid 222 if present. A slip ring 226 is provided that slidingly engages the rotary drive member 50, with an electrical conduit 228 connected thereto to transmit an electric current to the slip ring 226 from a power source (e.g. the vehicle battery). Electric current to the slip ring 226 transmits electric current into the rotary drive member 50, which in turn charges or magnetizes the particles 221, which in turn changes the holding force that is exerted between the face of the inertia member 86 and the face of the rotary drive member 50 that are exposed to the particles 221 in the chamber 224. Adjustment of the electric current to the slip ring 226 adjusts the amount of holding force is exerted between the inertia member 86 and the rotary drive member 50, which in turn adjusts the supplemental damping torque. Thus, the supplemental damping torque can be adjusted as noted above in relation to the embodiment shown in FIG. 13 to be higher when the crankshaft 16 approaches its natural frequency and lower at other times, as appropriate in order to maintain the three conditions identified above. Examples of suitable structures for a particle clutch that could be included as part of the combined isolation and torsional vibration damping device 46 include particle clutches provided by Ogura Industrial Corporation.

Based on the embodiments in FIGS. 13 and 14, it can be seen that the supplemental damping torque can be adjustable via an electric current.

Discussion of Design Methodology

Figure 15:
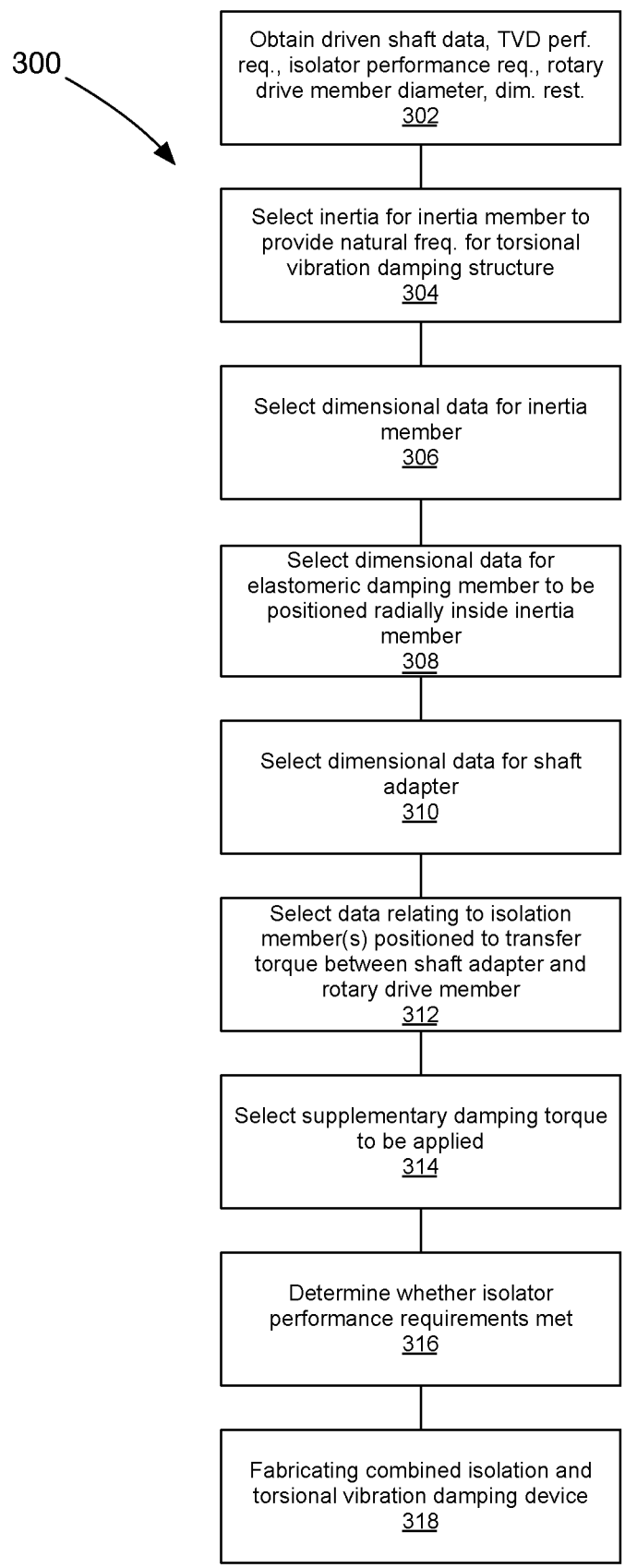
FIG. 15 is a flow chart of the general method of making a combined isolation and torsional vibration damping device in accordance with an embodiment.

Reference is made to FIG. 15, which shows a method 300 of making a combined isolation and torsional vibration damping device (e.g. the combined isolation and torsional vibration damping device 46) for a driven shaft (e.g. the crankshaft 16) that receives an input torque that varies cyclically between a peak input torque (Tinput) and a low input torque at a peak input torque frequency. Reference numbers relating to the elements identified above will be used to help illustrate the method 300, however, it will be noted that these are examples only, and that the other features of these components that are described above are not necessarily included in the present description of the method 300. It will be apparent to one skilled in the art what features would be included and what features would not.

The method 300 includes a step 302, which is obtaining a set of data relating to the driven shaft, a set of TVD performance requirements for, a set of isolator performance requirements, a diameter of the rotary drive member 50 which has the exterior drive surface 68 that is engageable with ue and a set of dimensional restrictions. Examples of the set of TVD performance requirements can include, for example, the maximum twist that is permissible in the driven shaft, and maximum permitted strain in the elastomeric damping member, a maximum permitted torque in the elastomeric damping member, a maximum permitted power dissipation per unit volume in the elastomeric damping member, and a maximum permitted temperature of the elastomeric damping member. While some of the data and requirements obtained in step 302 may be provided by a purchaser of the combined isolation and torsional vibration damping device 46 (e.g., a vehicle manufacturer), some of the data and/or requirements may be obtained by the provider of the combined isolation and torsional vibration damping device 46 (e.g., a Tier 1 supplier to the vehicle manufacturer). Step 304 includes selecting an inertia for an inertia member so as to provide a natural frequency for a torsional vibration damping structure that is based on a natural frequency for the driven shaft (and is preferably based on a natural frequency for the driven shaft with all the components mounted thereon that the driven shaft 16 will have on during use). Step 306 includes selecting dimensional data for the inertia member 86 to have the selected inertia based on the set of dimensional restrictions, and based on the diameter of the rotary drive member. Step 308 includes selecting dimensional data for the elastomeric damping member 88 to be positioned radially inside the inertia member 86. The inertia and the dimensional data for the elastomeric damping member 88 are selected so as to provide a natural frequency for a torsional vibration damping structure 54 that is based on a natural frequency for the driven shaft (and, as noted above, is preferably based on a natural frequency for the driven shaft with all the components mounted thereon that the driven shaft 16 will have on during use). Step 310 includes selecting dimensional data for the shaft adapter 48 that is connectible to the driven shaft. Step 312 includes selecting data relating to at least one isolation member 52 that is to be positioned to transfer torque between the shaft adapter 48 and the rotary drive member 60. The at least one isolation member 52 has an isolation member stiffness that is selected such that a natural frequency of a system made up of the external torque load and all portions of the combined isolation and torsional vibration damping device which transmit torque from the shaft adapter to the external torque load, is lower than the peak input torque frequency. Step 314 includes selecting a supplementary damping torque to be applied by at least one of friction damping during relative movement between the inertia member 86 and the rotary drive member 50, viscous damping during relative movement between the inertia member 86 and the rotary drive member 50, and magnetic damping during relative movement between the inertia member 86 and the rotary drive member 50. The supplementary damping torque is selected such that, during use of the driven shaft 16, a sum of torques applied to the shaft adapter 48 from a plurality of torque sources including the supplementary damping torque, a torque from viscous damping within the elastomeric damping member 88, a torque from elastic deformation of the elastomeric damping member 88, and a torque from inertia in the inertia member 86, opposes a torque applied to the shaft adapter 48 from the driven shaft 16 at a natural frequency of the driven shaft 16 with the combined isolation and torsional vibration damping device 46 thereon and limits a maximum twist between a first end 92 of the driven shaft 16 and a second end 94 of the driven shaft 16, to meet at least some of the TVD performance requirements. Step 316 includes determining whether the isolator performance requirements are met based on the at least one isolation member 52 and the supplementary damping torque. At step 318, if the set of TVD performance requirements and isolator performance requirements are met, fabricating a combined isolation and torsional vibration damping device 46 based on the selections made in steps 304-314. In some embodiments, the driven shaft 16 is a crankshaft of an internal combustion engine 10, and the supplementary damping torque is selected such that, during use of the driven shaft 16, the sum of torques limits the maximum twist from the first end 92 of the driven shaft 16 to the second end 94 of the driven shaft 16 to less than 0.35 degrees.

It will be noted that at least some of the steps described above do not need to be carried out in the order in which they are shown.

Discussion of Additional Features

It will be noted that the elastomeric damping member 88 is recessed axially from the inertia member 86 so as to prevent contact between the elastomeric damping layer 88 and the first and second side support layers 104 and 106, since such contact would inhibit sliding engagement between the inertia member 86 and the rotary drive member 50.

In the embodiment shown in FIG. 6A, the radially outer surface 204 of the inertia member 86 radially supports the radially inner surface 100 of the rotary drive member 50 via the radially outer support layer 99. As shown, the radially outer surface 204 is a contiguous cylindrical surface, which permits the entirety of the axial length of the radially outer surface 204 to be used as a bearing surface to support the rotary drive member 50.

Furthermore, it will be noted that the exterior drive surface has an axial length and has a geometric center that has a geometric center axial position, and wherein the inertia member has a center of mass that has a center of mass axial position that is approximately the same as the geometric center axial position.

The damping fluid 96 may optionally also be a lubricant wherein the arcuate helical compression springs 80 are immersed in the lubricant. During operation, the radially outer surface 85 of the arcuate helical compression springs 80 will rub on the spring shell 84 as the springs 80 contract and expand, and the lubricant will inhibit gouging of the spring shell 84 during such rubbing.

As can be seen in the embodiment shown in FIG. 6A, the elastomeric damping member 88 is positioned in the chamber 74 for exposure to the damping fluid 96 so as to cause transfer of heat from the elastomeric damping member 88 to the damping fluid 96. The temperature of the elastomeric damping member 88 impacts its longevity and impacts its stiffness, which, as can be seen in the equations above, impacts the natural frequency of the torsional vibration damping structure 54, and at least the torque Tedme and the torque Tedmv. It is advantageous therefore to transfer heat out of the elastomeric damping member 88 during operation of the combined isolation and torsional vibration damping device 46 so as to control the temperature of the elastomeric damping member 88.

Optionally, the damping fluid 96 has a heat transfer coefficient that is selected to keep a temperature of the elastomeric damping member below a selected maximum permitted temperature for the elastomeric damping member 88. Additionally or alternatively, the rotary drive member 50 may include an exterior surface finish that is selected from a group of surface finishes consisting of: dimpled, knurled and coated, so as to increase heat transfer from the damping fluid out of the rotary drive member 50 relative to the heat transfer that would occur from the damping fluid out of the rotary drive member 50 without the exterior surface finish. As another additional or alternative option, the rotary drive member 50 may include an interior surface finish that is selected from the group of surface finishes consisting of: dimpled, knurled and coated, so as to increase heat transfer from the damping fluid out of the rotary drive member 50 relative to the heat transfer that would occur from the damping fluid out of the rotary drive member 50 without the interior surface finish.

Referring to FIG. 6A, the damping fluid engagement surface 98 may optionally be coated in an oil-responsive coating 114. The oil-responsive coating 114 may be an oleophilic coating, so as to increase the adhesion of the damping fluid 96 to it, which increases the viscous damping force and torque that is applied to the shaft adapter 48 through the inertia member 86 and the elastomeric damping member 88 during relative movement of the inertia member 86 and the rotary drive member 50 relative to one another. In other embodiments the oil-responsive coating 114 may be an oleophobic coating. For example, in embodiments where the inertia member 86 is a standardized part, but has a greater inertia than is needed, it may be desired to reduce the amount of viscous damping that is provided by the supplemental damping structure 90 by providing an oleophobic coating for the coating 114. The oil-responsive coating 114 permits the management of grease (or other lubricant) so as to, for example, inhibit the grease (or other lubricant) from adhering to certain areas in dead zones where the grease (or other lubricant) might bake or otherwise degrade. The oil-responsive coating 114 further permits the management of the location of the lubricant in the chamber 74 as needed.

Optionally, the damping fluid engagement surface 98 has a selected drag coefficient that is selected in addition to selecting the viscosity of the damping fluid 96, so as to provide a selected amount of the torque from viscous damping from movement of the inertia member through the damping fluid. This drag coefficient may be provided in any suitable way, such as by way of channels or other features that guide the flow of damping fluid therealong to increase the speed dependency of the viscous damping torque.

In some embodiments, the damping fluid 96 may be a traction fluid. Traction fluid may have properties that can enhance the heat transfer out of the elastomeric damping member 88 and into the rotary drive member 50. Examples of traction fluid include Valvoline Invaritorc-638 TDF and Idemitsu-Kosan TDF traction drive fluid.

Optionally the damping fluid is a rheopectic fluid which controls (specifically enhances) the speed dependent responsiveness of the fluid so as to tailor the viscous damping torque for a given application so as to meet the three conditions noted above.

While the combined isolation and torsional vibration damping device 46 has been described for use with a crankshaft 16, it will be noted that it can be used in many other applications such as on an inlet shaft of a supercharger, an inlet shaft of an air conditioning compressor or other compressor (particularly those that use pistons or other reciprocating elements), a shaft in a vehicular transmission, a drive shaft in a powertrain that extends between the transmission and the driven wheels, a fuel pump inlet shaft, or a flywheel shaft if separate from the crankshaft.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. A combined isolation and torsional vibration damping device for a driven shaft that receives an input torque that varies cyclically between a peak input torque and a low input torque at a peak input torque frequency, comprising:

a shaft adapter that is connectible to the driven shaft, wherein the shaft adapter defines an axis;

a rotary drive member that is rotatably connected to the shaft adapter, wherein the rotary drive member has an exterior drive surface that is engageable with an external torque load so as to transmit torque to the external torque load, and wherein the rotary drive member at least partially encloses a chamber;

at least one isolation member positioned to transfer torque between the shaft adapter and the rotary drive member, wherein the at least one isolation member has an isolation member stiffness that is selected such that a natural frequency of a system made up of the external torque load and all portions of the combined isolation and torsional vibration damping device which transmit torque from the shaft adapter to the external torque load, is lower than the peak input torque frequency; and a torsional vibration damping structure that includes an inertia member that is entirely contained in the chamber and an elastomeric damping member positioned to elastically connect the shaft adapter and the inertia member; wherein a stiffness of the elastomeric damping member and an inertia of the inertia member provide the torsional vibration damping structure with a natural frequency that is at least 50% of the natural frequency of the driven shaft, wherein the chamber contains a damping fluid, and wherein the inertia member has a damping fluid engagement surface that travels through the damping fluid during relative movement between the rotary drive member and the shaft adapter so as to cause viscous damping between the inertia member and the rotary drive member, and wherein a viscosity of the damping fluid, an inertia of the inertia member, and a stiffness of the elastomeric damping member are selected such that, during use of the driven shaft, a sum of torques applied to the shaft adapter from a plurality of torque sources including a torque from viscous damping from movement of the inertia member through the damping fluid, a torque from viscous damping within the elastomeric damping member, a torque from elastic deformation of the elastomeric damping member, and a torque from inertia in the inertia member, opposes a torque applied to the shaft adapter from the driven shaft at a natural frequency of the driven shaft with the combined isolation and torsional vibration damping device thereon and limits a maximum twist between a first end of the driven shaft and a second end of the driven shaft, to below a yield point of the driven shaft.

2. A combined isolation and torsional vibration damping device as claimed in claim 1, further comprising a radially outer support layer positioned radially between the inertia member and a radially inner surface of the rotary drive member in the chamber, which supports the rotary drive member on the shaft adapter.

3. A combined isolation and torsional vibration damping device as claimed in claim 2, wherein the radially outer support layer is fixedly connected to the rotary drive member and is slidably engaged with the inertia member.

4. A combined isolation and torsional vibration damping device as claimed in claim 2, further comprising a first side support layer positioned axially between the inertia member and a first side wall of the rotary drive member and a second side support layer positioned axially between the inertia member and a second side wall of the rotary drive member.

5. A combined isolation and torsional vibration damping device as claimed in claim 2, wherein the inertia member has a radially outer surface that radially supports the radially inner surface of the rotary drive member via the radially outer support layer and is a contiguous cylindrical surface.

6. A combined isolation and torsional vibration damping device as claimed in claim 1, wherein the elastomeric damping layer is recessed axially from the inertia member so as to prevent contact between the elastomeric damping layer and the first and second side support layers.

7. A combined isolation and torsional vibration damping device as claimed in claim 1, wherein the elastomeric damping member is positioned in the chamber for exposure to the damping fluid so as to cause transfer of heat from the elastomeric damping member to the damping fluid.

8. A combined isolation and torsional vibration damping device as claimed in claim 1, wherein the rotary drive member is a pulley and wherein the exterior drive surface is bound by a first flange having a first flange axially exterior wall surface and a second flange having a second flange axially exterior wall surface, and wherein the inertia member extends axially within the first flange exterior wall surface and the second flange axially exterior wall surface.

9. A combined isolation and torsional vibration damping device as claimed in claim 1, wherein the rotary drive member is a pulley and the external torque transfer member is an accessory drive belt.

10. A combined isolation and torsional vibration damping device as claimed in claim 1, wherein the driven shaft is a crankshaft of an internal combustion engine and the sum of torques limits the maximum twist from the first end of the driven shaft to the second end of the driven shaft to less than 0.35 degrees.

11. A combined isolation and torsional vibration damping device as claimed in claim 1, wherein the elastomeric damping member has a center of mass that has a center of mass axial position, and wherein the inertia member has a center of mass that has a center of mass axial position, wherein the center of mass axial position for the elastomeric damping member is approximately the same as the center of mass axial position for the inertia member.

12. A combined isolation and torsional vibration damping device for a driven shaft that receives an input torque that varies cyclically between a peak input torque and a low input torque at a peak input torque frequency, comprising:

a shaft adapter that is connectible to the driven shaft, wherein the shaft adapter defines an axis;

a rotary drive member that is rotatably connected to the shaft adapter, wherein the rotary drive member has an exterior drive surface that is engageable with an external torque load so as to transmit torque to the external torque load, and wherein the rotary drive member at least partially encloses a chamber;

at least one isolation member positioned to transfer torque between the shaft adapter and the rotary drive member, wherein the at least one isolation member has an isolation member stiffness that is selected such that a natural frequency of a system made up of the external torque load and all portions of the combined isolation and torsional vibration damping device which transmit torque from the shaft adapter to the external torque load, is lower than the peak input torque frequency;

a torsional vibration damping structure that includes an inertia member that is entirely contained in the chamber and an elastomeric damping member positioned to elastically connect the shaft adapter and the inertia member, wherein the inertia member has an inertia, and the elastomeric damping member has a stiffness, wherein a stiffness of the elastomeric damping member and the inertia of the inertia member provide the torsional vibration damping structure with a natural frequency that is at least 50% of the natural frequency of the driven shaft; and a supplemental damping structure that is contained in the chamber, wherein the supplemental damping structure applies a supplemental damping torque to resist relative movement between the rotary drive member and the inertia member in addition to damping provided by the elastomeric damping member, wherein the supplemental damping torque, the inertia of the inertia member, and the stiffness of the elastomeric damping member are selected such that, during use of the driven shaft, a sum of torques applied to the shaft adapter from a plurality of torque sources including the supplemental damping torque, a torque from viscous damping within the elastomeric damping member, a torque from elastic deformation of the elastomeric damping member, and a torque from the inertia in the inertia member, opposes a torque applied to the shaft adapter from the driven shaft at a natural frequency of the driven shaft with the combined isolation and torsional vibration damping device thereon, and limits a maximum twist between a first end of the driven shaft and a second end of the driven shaft, to below a yield point of the driven shaft.

13. A combined isolation and torsional vibration damping device as claimed in claim 12, wherein the supplemental damping structure is a frictional damping structure including a first friction surface arrangement and a second friction surface arrangement that is slidingly engageable with the first friction surface arrangement during relative movement between the inertia member and the rotary drive member generating frictional damping based on an overall coefficient of friction between the first friction surface arrangement and the second friction surface arrangement, wherein the overall coefficient of friction is selected so as to provide the selected supplemental damping torque.

14. A combined isolation and torsional vibration damping device as claimed in claim 13, wherein the frictional damping structure includes a radially outer frictional engagement layer positioned radially between the inertia member and a radially inner surface of the rotary drive member in the chamber, wherein the radially outer frictional engagement layer is slidingly engageable with at least one of the rotary drive member and the inertia member so as to generate friction.

15. A combined isolation and torsional vibration damping device as claimed in claim 14, wherein the radially outer frictional engagement layer is a bushing that is slidable relative to both the rotary drive member and to the inertia member.

16. A combined isolation and torsional vibration damping device as claimed in claim 14, wherein the frictional damping structure further includes a first side frictional engagement layer positioned axially between the inertia member and a first side wall of the rotary drive member and a second side frictional engagement layer positioned axially between the inertia member and a second side wall of the rotary drive member, wherein each of the first and second side frictional engagement layers is slidingly engageable with at least one of the rotary drive member and the inertia member so as to generate friction.

17. A combined isolation and torsional vibration damping device as claimed in claim 16, wherein the elastomeric damping layer is recessed axially from the inertia member so as to prevent contact between the elastomeric damping layer and the first and second side support layers.

18. A combined isolation and torsional vibration damping device as claimed in claim 12, wherein the exterior drive surface has an axial length and has a geometric center that has a geometric center axial position, and wherein the inertia member has a center of mass that has a center of mass axial position that is approximately the same as the geometric center axial position.

19. A combined isolation and torsional vibration damping device as claimed in claim 12, wherein the rotary drive member is a pulley and wherein the exterior drive surface is bound by a first flange having a first flange axially exterior face and a second flange having a second flange axially exterior face, and wherein the inertia member extends axially, fitting between the first flange axially exterior face and the second flange axially exterior face.

20. A combined isolation and torsional vibration damping device as claimed in claim 13, wherein the frictional damping structure includes a first friction plate and a second friction plate that moves rotationally relative to the first friction plate during movement of the inertia member relative to the rotary drive member and wherein a frictional force acting between the first plate and the second plate is adjustable via an electric current, and generates a torque that is included in the torque from frictional damping.

* * * * *